(12) United States Patent
Asakawa et al.

(10) Patent No.: US 10,246,012 B2
(45) Date of Patent: Apr. 2, 2019

(54) STEERING WHEEL

(71) Applicant: TOYODA GOSEI CO., LTD., Kiyosu-shi, Aichi-ken (JP)

(72) Inventors: Renge Asakawa, Kiyosu (JP); Atsushi Nagata, Kiyosu (JP); Yasushi Hibino, Kiyosu (JP); Shinichi Takeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/373,543

(22) Filed: Dec. 9, 2016

(65) Prior Publication Data
US 2017/0166116 A1 Jun. 15, 2017

(30) Foreign Application Priority Data

Dec. 14, 2015 (JP) .................. 2015-243307

(51) Int. Cl.
| | |
|---|---|
| B60Q 1/00 | (2006.01) |
| B60Q 1/54 | (2006.01) |
| B60Q 1/34 | (2006.01) |
| G08B 5/22 | (2006.01) |
| B60C 23/00 | (2006.01) |
| B60Q 3/283 | (2017.01) |
| B60Q 3/80 | (2017.01) |
| B60Q 3/64 | (2017.01) |
| B62D 1/04 | (2006.01) |
| B62D 1/06 | (2006.01) |
| B60Q 9/00 | (2006.01) |

(52) U.S. Cl.
CPC .............. *B60Q 3/283* (2017.02); *B60Q 3/64* (2017.02); *B60Q 3/80* (2017.02); *B60Q 9/002* (2013.01); *B60Q 9/008* (2013.01); *B62D 1/046* (2013.01); *B62D 1/06* (2013.01)

(58) Field of Classification Search
None
See application file for complete search history.

(56) References Cited

U.S. PATENT DOCUMENTS

| | | | | |
|---|---|---|---|---|
| 5,337,694 A | * | 8/1994 | Nix ...................... | B60Q 1/0082 114/144 R |
| 6,453,769 B2 | * | 9/2002 | Sakurai ................ | B60Q 1/0082 74/552 |

(Continued)

FOREIGN PATENT DOCUMENTS

| | | |
|---|---|---|
| JP | S63-253903 A | 10/1988 |
| JP | 2000-113711 A | 4/2000 |

(Continued)

OTHER PUBLICATIONS

Office Action dated Nov. 20, 2018 in the corresponding Japanese Patent Application No. 2015-243307 (and English translation).

(Continued)

*Primary Examiner* — Steven Lim
*Assistant Examiner* — Muhammad Adnan
(74) *Attorney, Agent, or Firm* — Posz Law Group, PLC

(57) ABSTRACT

A steering wheel includes an indicator. The indicator includes a light source that emits light and a light guide. The light guide includes an outer surface and an end opposing the light source. The light emitted from the light source enters the end of the light guide, and some of the light is emitted from the outer surface.

11 Claims, 13 Drawing Sheets

(56) References Cited

U.S. PATENT DOCUMENTS

| | | | | |
|---|---|---|---|---|
| 7,352,339 | B2* | 4/2008 | Morgan | F24C 7/004 340/815.68 |
| 7,694,997 | B2* | 4/2010 | Burghardt | B60R 21/2037 280/728.1 |
| 7,699,509 | B2* | 4/2010 | Leleve | B60Q 1/12 362/464 |
| 8,201,980 | B2* | 6/2012 | Ookubo | F21S 41/147 362/517 |
| 8,955,876 | B2* | 2/2015 | Strecker | B60R 21/2037 280/731 |
| 9,403,552 | B2* | 8/2016 | Onohara | B60R 21/2037 |
| 9,442,239 | B2* | 9/2016 | Kato | G02B 6/0036 |
| 9,463,694 | B1* | 10/2016 | Clark | B60K 37/02 |
| 9,736,364 | B2* | 8/2017 | Han | H04N 5/23229 |
| 9,821,703 | B2* | 11/2017 | Lisseman | B60Q 1/00 |
| 2005/0174792 | A1* | 8/2005 | Matsuura | B60Q 1/0011 362/511 |
| 2005/0189159 | A1 | 9/2005 | Weber et al. | |
| 2007/0153535 | A1* | 7/2007 | Bostick | B60Q 9/00 362/488 |
| 2008/0061954 | A1* | 3/2008 | Kulas | B60K 35/00 340/438 |
| 2008/0084404 | A1* | 4/2008 | Andre | G09F 9/30 345/204 |
| 2008/0143505 | A1 | 6/2008 | Maruyama et al. | |
| 2010/0080010 | A1* | 4/2010 | Marui | B60Q 3/74 362/488 |
| 2011/0228193 | A1* | 9/2011 | Shin | G02F 1/133606 349/61 |
| 2012/0250342 | A1* | 10/2012 | Reuschel | B60K 37/00 362/488 |
| 2014/0109719 | A1 | 4/2014 | Lisseman et al. | |
| 2014/0111324 | A1* | 4/2014 | Lisseman | B62D 1/046 340/435 |
| 2014/0246980 | A1 | 9/2014 | Petsch | |
| 2014/0301097 | A1* | 10/2014 | Neumann | B60K 35/00 362/488 |
| 2014/0328077 | A1* | 11/2014 | Tovar | B62D 1/046 362/511 |
| 2015/0008840 | A1 | 1/2015 | Reinprecht et al. | |
| 2015/0022335 | A1 | 1/2015 | Reinprecht | |
| 2015/0375677 | A1* | 12/2015 | Salter | B62D 1/06 362/510 |
| 2015/0375678 | A1* | 12/2015 | Salter | B60Q 1/1469 362/464 |
| 2016/0025281 | A1* | 1/2016 | Gardner | B62D 1/06 362/516 |
| 2016/0082881 | A1 | 3/2016 | Yamamoto et al. | |
| 2016/0218299 | A1* | 7/2016 | Haketa | C07D 401/04 |
| 2017/0311029 | A1* | 10/2017 | Jung | H04N 21/41422 |

FOREIGN PATENT DOCUMENTS

| | | | | |
|---|---|---|---|---|
| JP | 2000113711 A | * | 4/2000 | |
| JP | 2005-231622 A | | 9/2005 | |
| JP | 2007-153048 A | | 6/2007 | |
| JP | 2008-150029 A | | 7/2008 | |
| JP | 2010-182526 A | | 8/2010 | |
| JP | 2014-069671 A | | 4/2014 | |
| JP | 2015-054564 A | | 3/2015 | |
| JP | 2015-511903 A | | 4/2015 | |
| JP | WO 2016031296 A1 | * | 3/2016 | B60Q 3/20 |
| WO | 2014/192797 A1 | | 12/2014 | |

OTHER PUBLICATIONS

Office action dated Jan. 22, 2019 issued in corresponding JP patent application No. 2015-243307 (and English translation thereof).

* cited by examiner

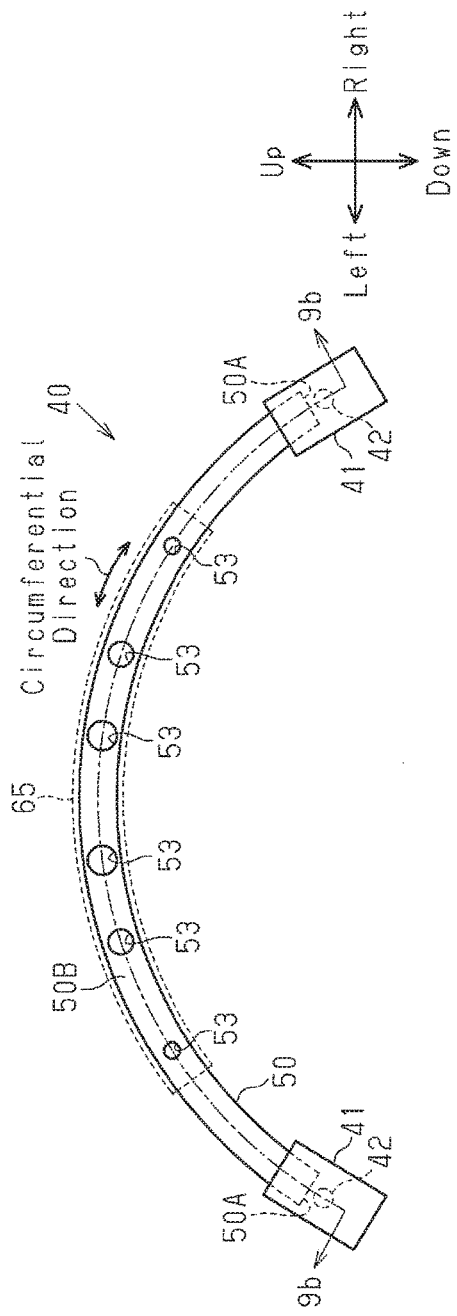
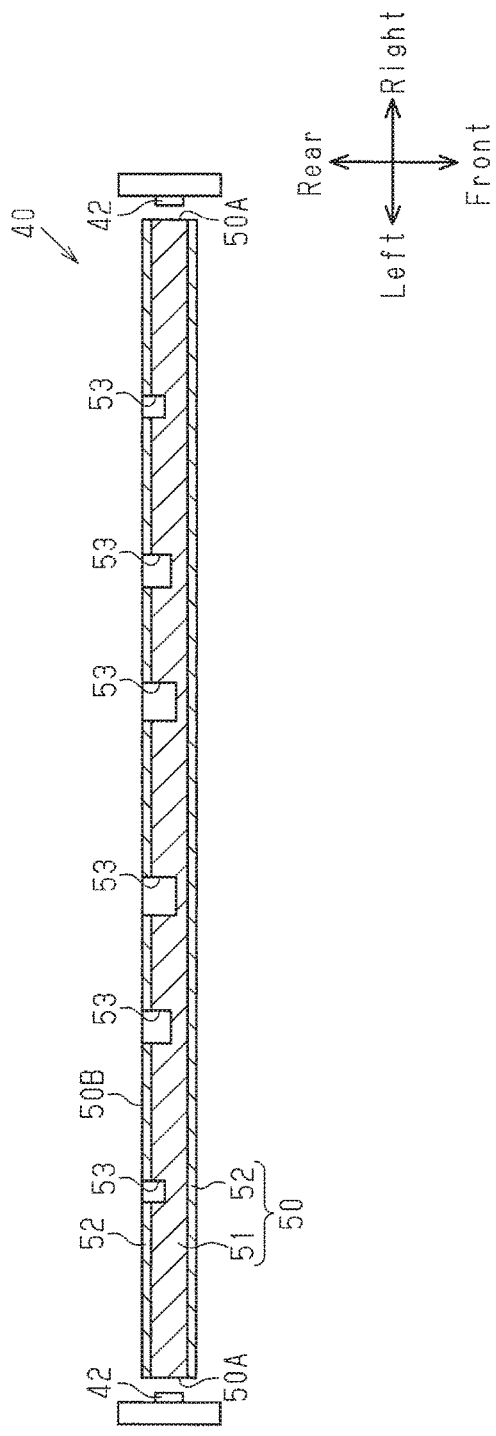
Fig.9A
Fig.9B

STEERING WHEEL

BACKGROUND OF THE INVENTION

The present invention relates to a steering wheel.

A steering wheel known in the art includes a ring provided with an indicator (refer to, for example, Japanese Laid-Open Patent Publication No. 2014-69671). In such a steering wheel, the ring includes a groove, and a light emitting diode serving as the indicator is arranged in the groove. The light emitting diode indicates, for example, information related to autonomous driving, the vehicle speed, the engine speed, the vehicle interior temperature, the radio frequency, and the selected transmission gear.

In the steering wheel, a large number of light emitting diodes are arranged in the groove that is formed in a circumferential direction of the ring. This increases costs and power consumption.

SUMMARY OF THE INVENTION

It is an object of the present invention to provide a steering wheel that reduces costs and power consumption.

To achieve the above object, a steering wheel according to one aspect of the present invention includes an indicator. The indicator includes a light source that emits light and a light guide. The light guide includes an outer surface and an end opposing the light source. The light emitted from the light source enters the end of the light guide, and some of the light is emitted from the outer surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9A is a front view of light emitting units and a light guide shown in FIG. 2;

FIG. 9B is a schematic cross-sectional view taken along line 9b-9b in FIG. 9A;

DETAILED DESCRIPTION OF THE PREFERRED EMBODIMENTS

One embodiment of a steering wheel for a vehicle will now be described with reference to FIGS. 1 to 14. To facilitate understanding, features may be exaggerated in FIGS. 1 to 14 and elements may have not necessarily been drawn to scale.

Figure 1:
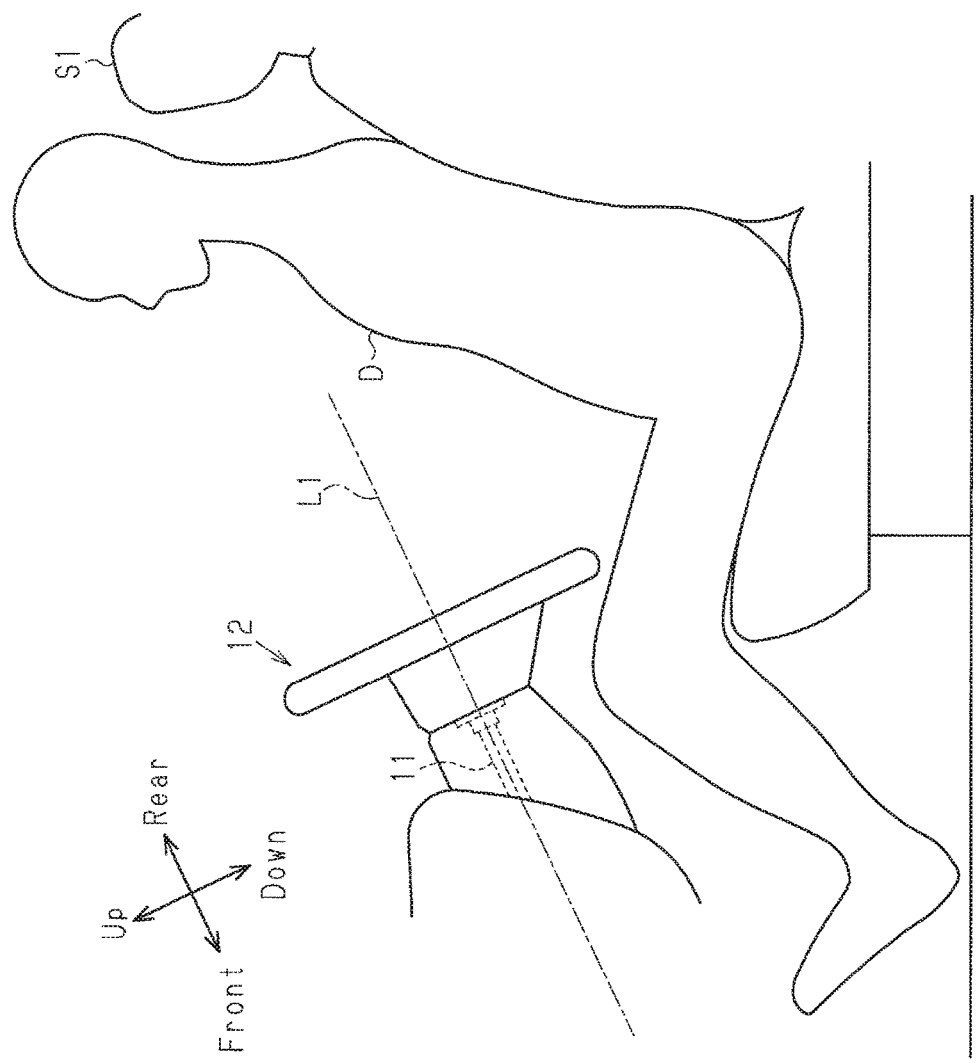
FIG. 1 is a side view showing a vehicle to which one embodiment of a steering wheel is coupled.

As shown in FIG. 1, a steering shaft 11 rotated about an axis L1 is arranged at the front side (left side as viewed in FIG. 1) of a driver seat S1 in a vehicle. The steering shaft 11 is inclined in the vehicle so that the steering shaft 11 is higher as the steering shaft 11 becomes closer to the driver seat S1 (right side as viewed in FIG. 1). A steering wheel 12 is coupled to and rotated integrally with a rear end of the steering shaft 11.

In this specification, the direction extending along the axis L1 of the steering shaft 11 is referred to as the "front-to-rear direction" of the steering wheel 12, and among the directions extending along a surface orthogonal to the axis L1, the direction in which the steering wheel 12 extends is referred to as the "vertical direction." Thus, the front-to-rear direction and the vertical direction of the steering wheel 12 are slightly inclined with respect to the front-to-rear direction (horizontal direction) and the vertical direction of the vehicle. Further, the direction orthogonal to the "front-to-rear direction" and the "vertical direction" is referred to as the sideward direction of the steering wheel 12.

Figure 2:
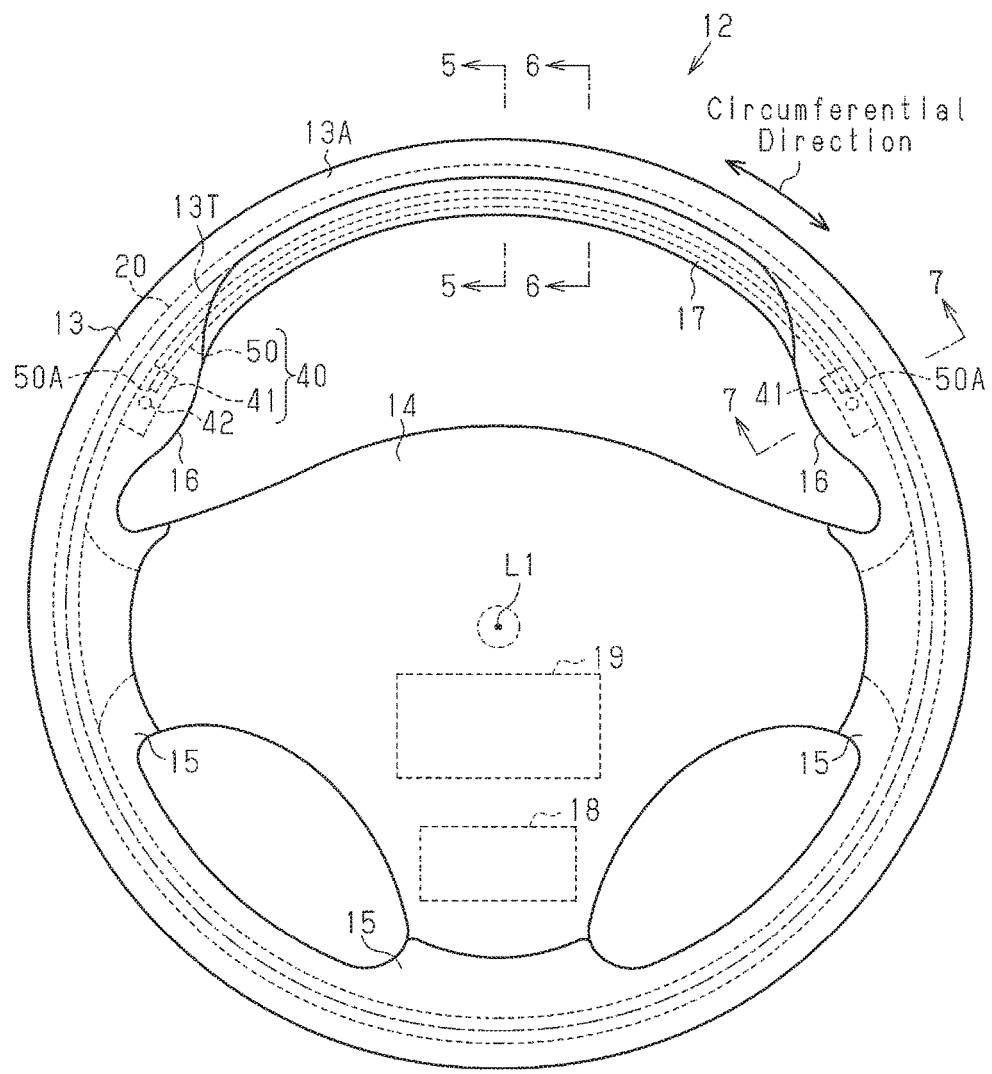
FIG. 2 is a front view of the steering wheel shown in FIG. 1.
Figure 2:
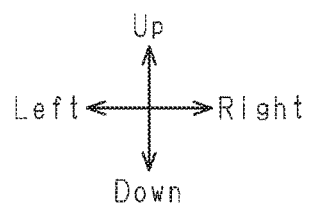

FIG. 2 shows the outer appearance of the steering wheel 12 as viewed from the front (driver seat S1). Further, FIG. 2 shows the steering wheel 12 in a steering reference state in which the steering angle is zero degrees (when vehicle is steered straight).

As shown in FIG. 2, the steering wheel 12 includes a ring 13 (also referred to as handle or rim), a boss 14 located at a central part of the ring 13, and a plurality of (three in this embodiment) spokes 15 that couple the ring 13 and the boss 14. The ring 13 is held and rotated (steered) by a driver D (refer to FIG. 1). The ring 13 has an annular shape and extends around the axis L1. The boss 14 is arranged in the region surrounded by the ring 13.

In this specification, the frame of reference for "up," "down," "left," and "right" is based on the steering reference state when specifying a position of the steered ring 13 in the circumferential direction (that is, circumferential direction around axis L1 (boss 14)).

Assisting portions 16 that assist the driver when holding and steering the ring 13 are respectively arranged at the left and right sides of the ring 13 located slightly upward from the boss 14. The assisting portions 16 are more bulged toward the boss 14 (axis L1) than other portions of the ring 13.

A translucent cover 17 that covers part of an indicator 40 in the ring 13 is arranged in the ring 13 at the upper side of the assisting portions 16. The indicator 40 is arranged in the ring 13, which is located upward from the boss 14, shown in FIG. 2. The indicator 40 includes two light emitting units 41, a light guide 50 that has the form of a rod (round rod in this specification) and extends in the circumferential direction of the ring 13 between the two light emitting units 41, and a holding member 60 (refer to FIG. 3) that holds the light emitting units 41 and the light guide 50. Each light emitting unit 41 includes a light source 42. The light guide 50 includes ends 50A that are respectively opposed to the light sources 42 and accommodated in the light emitting units 41. In the indicator 40, when the light source 42 emits light, the light emitted from the light sources 42 enters the light guide 50 through the ends 50A. The light that enters the light guide 50 is repeatedly reflected internally in the light guide 50 and guided in the longitudinal direction (circumferential direction) of the light guide 50. The light slightly leaks out of the outer surface of the light guide 50. This causes the light guide 50, which extends in the circumferential direction of the ring 13, to emit light in a linear manner. The light is emitted from the light guide 50 out of the ring 13 through the cover 17 and then emitted toward the driver seat. In such a manner, the illuminated portion (light emission portion) of the indicator 40 includes the two light sources 42 and the light guide 50.

A vibration unit 18, see FIG. 2, that vibrates the steering wheel 12 is arranged in the steering wheel 12 (for example, boss 14). Further, a control circuit 19 that controls the indicator 40 and the vibration unit 18 is arranged in the steering wheel 12 (for example, boss 14). The control circuit 19 controls, for example, a light emission mode of light (amount of light, color, or the like) from the light sources 42.

Figure 3:
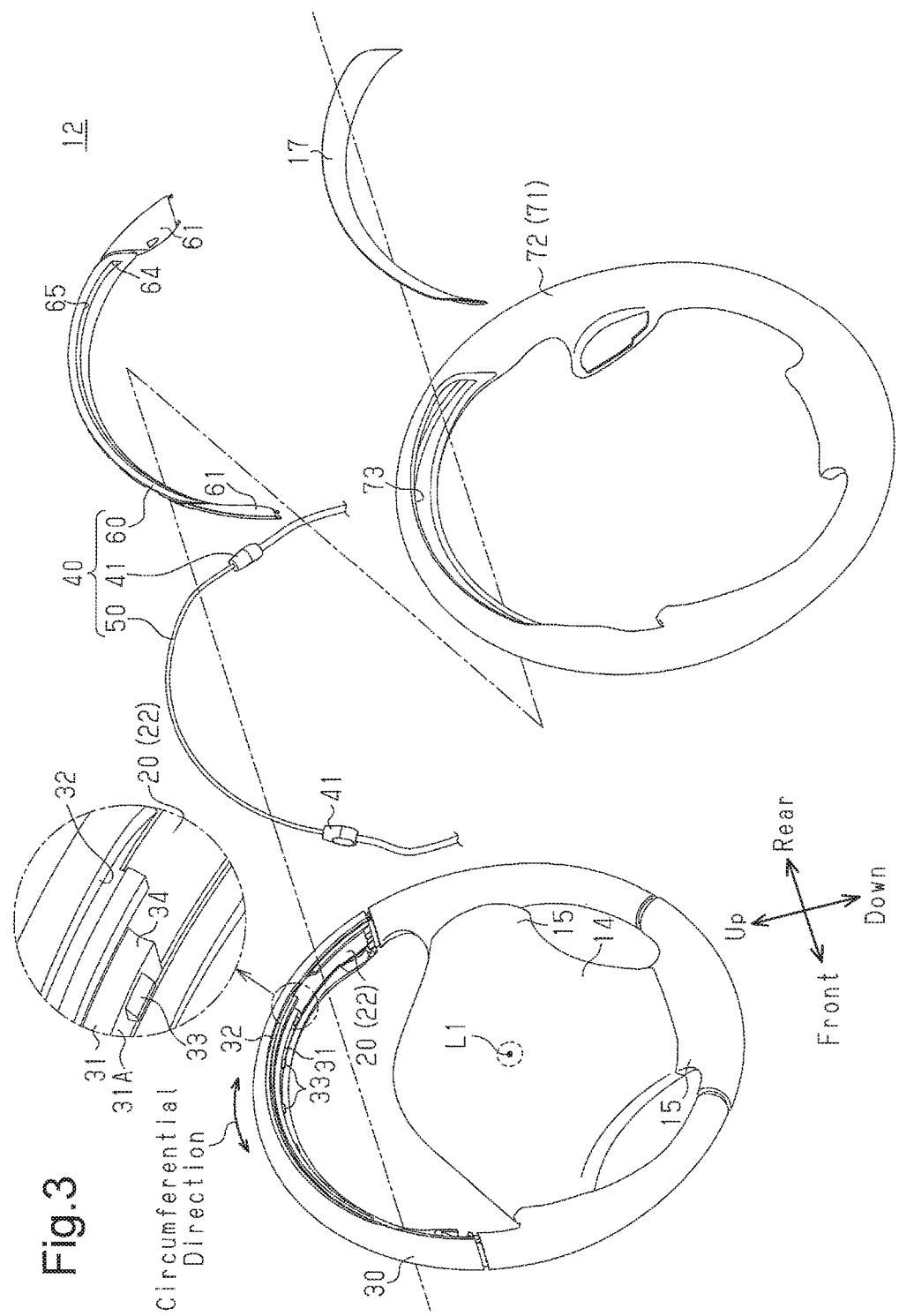
FIG. 3 is an exploded perspective view of the steering wheel shown in FIG. 2.
Figure 4:
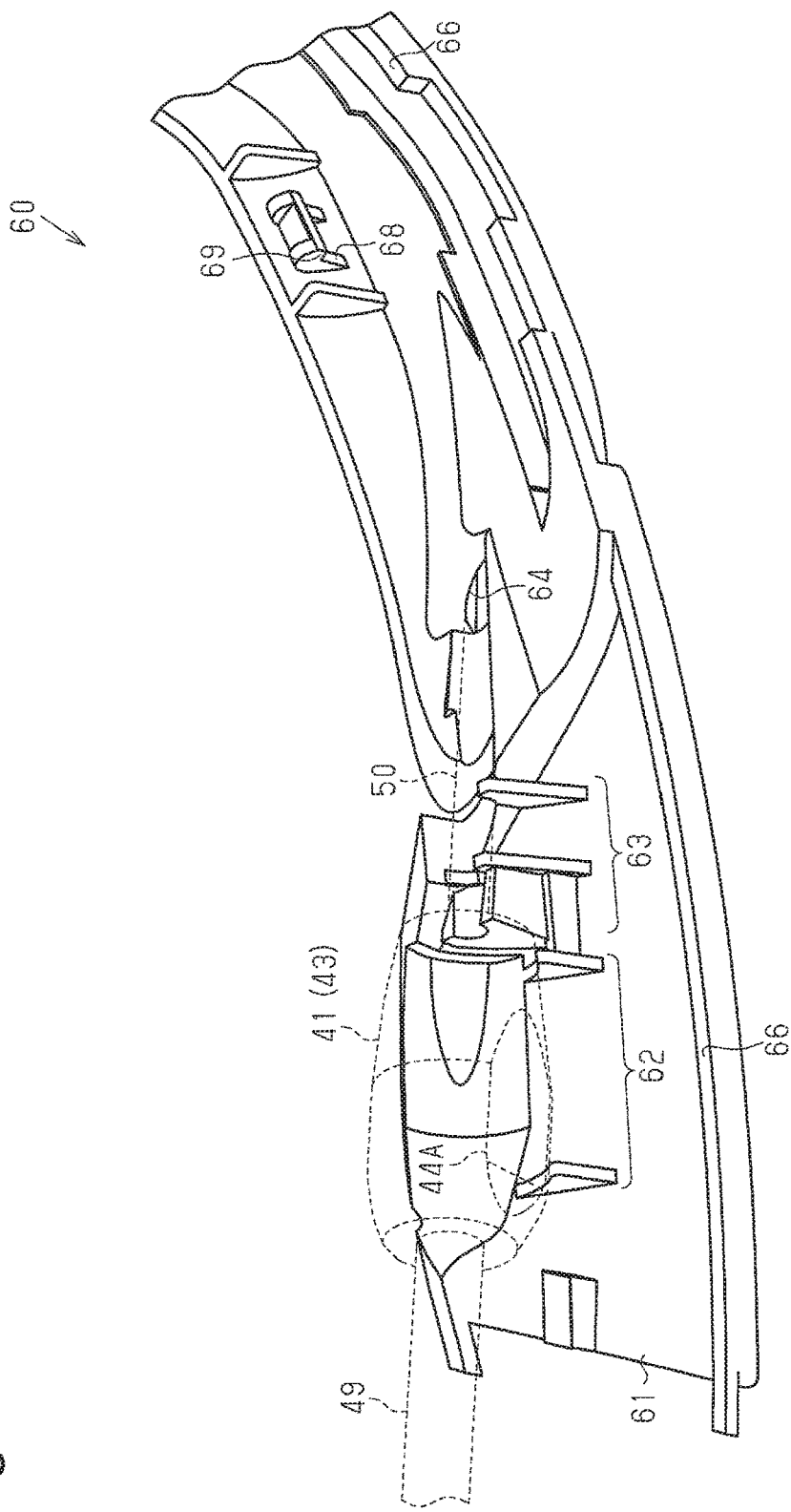
FIG. 4 is a schematic perspective view of a holding member in the steering wheel shown in FIG. 2.
Figure 5:
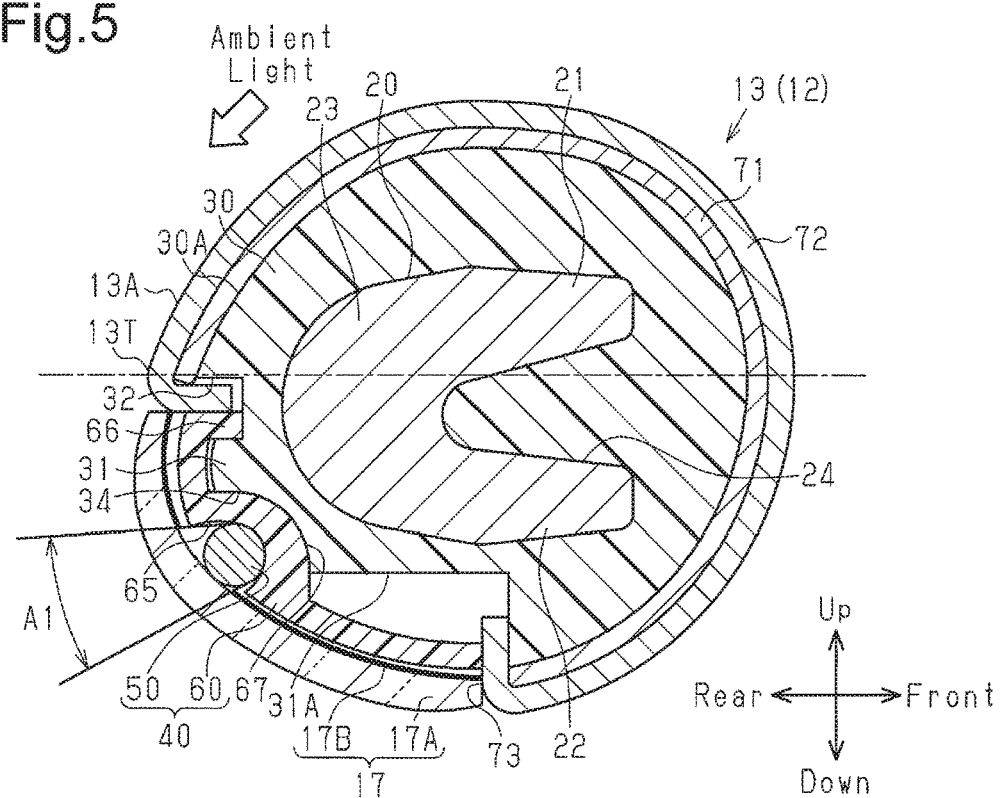
FIG. 5 is a schematic cross-sectional view taken along line 5-5 in FIG. 2.
Figure 6:
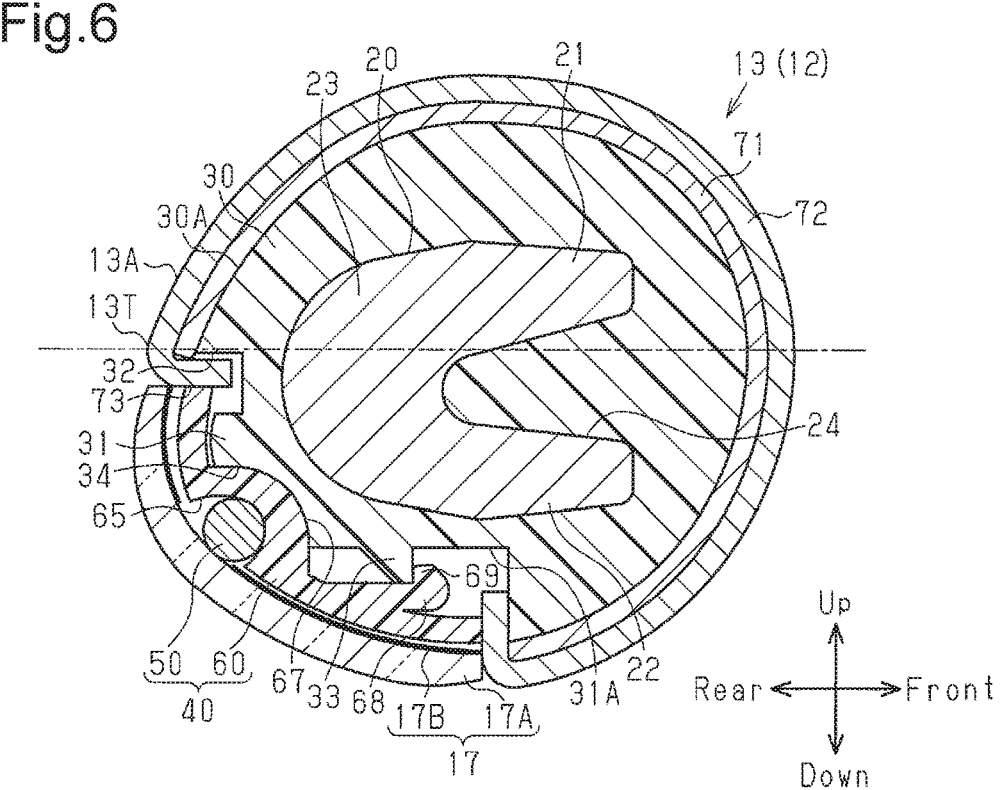
FIG. 6 is a schematic cross-sectional view taken along line 6-6 in FIG. 2.
Figure 7:
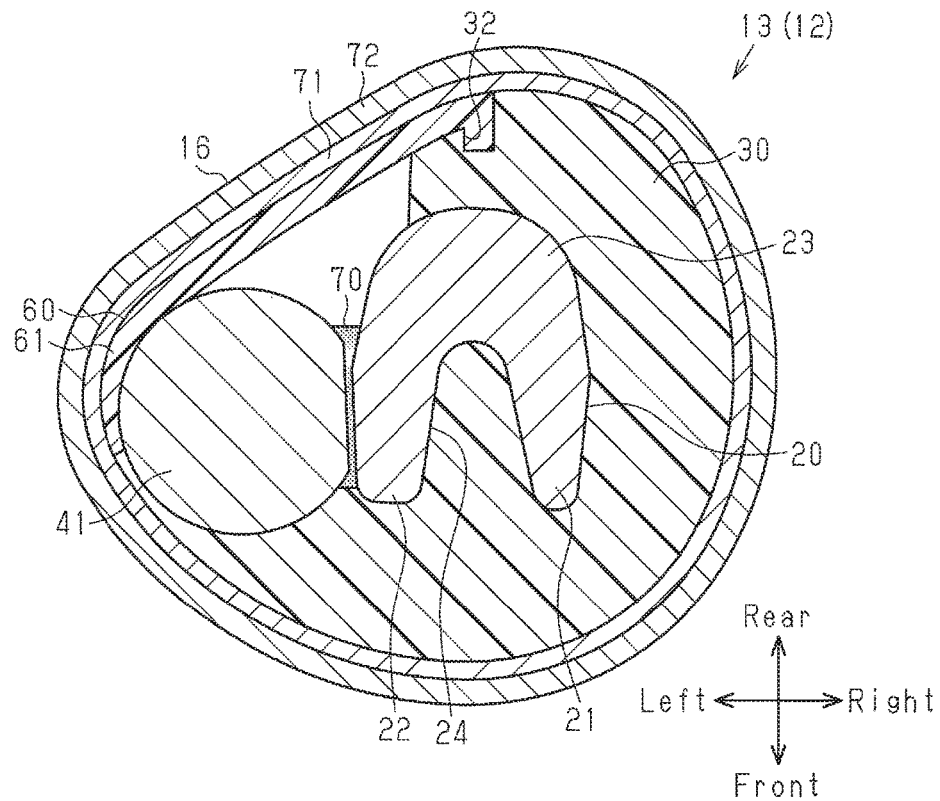
FIG. 7 is a schematic cross-sectional view taken along line 7-7 in FIG. 2.

The internal structure of the steering wheel 12 (particularly, ring 13) will now be described with reference to FIGS. 2 to 7. FIG. 4 is a schematic perspective view showing the holding member 60 as viewed from the front side (side opposite to driver seat). FIG. 5 shows the cross-sectional structure of the ring 13 taken along line 5-5 in FIG. 2. FIG. 6 shows the cross-sectional structure of the ring 13 taken along line 6-6 in FIG. 2. FIG. 7 shows the cross-sectional structure of the ring 13 taken along line 7-7 in FIG. 2.

As shown in FIG. 2, metal cores are arranged in the ring 13, the boss 14, and the spokes 15 of the steering wheel 12, respectively. Among the metal cores, the one located in the ring 13 is referred to as the ring metal core 20. The ring metal core 20, which serves as the frame of the ring 13, has an annular shape and extends around the axis L1 as viewed from the driver seat. The material of the ring metal core 20 may be, for example, copper, aluminum, magnesium, or an alloy of these elements.

As shown in FIG. 5, the ring metal core 20 is located inward from the outer surface of the ring 13. The ring metal core 20 includes an outer annular portion 21, an inner annular portion 22, and a coupling annular portion 23. The outer annular portion 21 has an annular shape and extends around the axis L1 (refer to FIG. 2). The inner annular portion 22 has an annular shape and extends around the axis L1. Further, the inner annular portion 22 has a slightly smaller diameter than the outer annular portion 21. The coupling annular portion 23 has an annular shape and extends around the axis L1. Further, the coupling annular portion 23 couples the outer annular portion 21 to the inner annular portion 22 at the rear sides of the outer annular portion 21 and the inner annular portion 22. The space surrounded by the outer annular portion 21, the inner annular portion 22, and the coupling annular portion 23 defines a groove 24 that opens in the front surface of the ring metal core 20. The groove 24 extends along substantially the entire circumference of the ring 13. Since the ring metal core 20 has a structure including the groove 24, the ring metal core 20 has a U-shaped cross-sectional shape. The cross section of the ring metal core 20 does not have to be U-shaped and may be shaped in other forms.

The surface of the ring metal core 20 is covered by a base 30. The base 30 is rigid enough to resist deformation when held by the driver. The cross-sectional shape of the base 30 is, for example, oval. The material of the base 30 may be, for example, polyethylene, an olefin resin such as polypropylene, an ester resin such as polyethylene terephthalate, polyamide, polycarbonate, or ABS resin.

As shown in FIGS. 5 and 6, the base 30 surrounds the entire ring metal core 20 at portions of the ring 13 in the circumferential direction (for example, portions other than assisting portions 16 (refer to FIG. 2)). That is, the base 30 fills the groove 24 of the ring metal core 20 to entirely contact and cover the surfaces of the outer annular portion 21, the inner annular portion 22, and the coupling annular portion 23.

As shown in FIG. 7, the base 30 at the assisting portions 16 exposes part of the surface of the ring metal core 20, namely, the outer surface of the inner annular portion 22 (surface directed toward boss 14). Further, the base 30 at the assisting portions 16 fills the groove 24 of the ring metal core 20 to entirely contact and cover the surfaces of the outer annular portion 21 and the coupling annular portion 23.

As shown in FIGS. 5 and 6, the base 30 has a rear surface 30A serving as a driver side surface that includes a coupling portion 31 to which the indicator 40 is coupled. The coupling portion 31 is located at the lower side of the rear surface 30A. The coupling portion 31 is thinner than other portions of the base 30.

The upper end of the coupling portion 31 includes a groove 32. As shown in FIG. 3, the groove 32 is slit-shaped and elongated in the circumferential direction.

Portions of a lower surface 31A of the coupling portion 31 in the circumferential direction include engagement projections 33. The engagement projections 33 project downwardly from the lower surface 31A of the coupling portion 31. The engagement projections 33 are, for example, spaced apart from one another by a predetermined interval in the circumferential direction.

As shown in FIGS. 5 and 6, a curved portion 34 is curved and recessed toward the ring metal core 20 between the lower surface 31A of the coupling portion 31 and the groove 32. The curved portion 34 corresponds to the location where the light guide 50, which has the form of a round rod, is arranged. The curved portion 34 extends in the circumferential direction.

The base 30 having the above structure is formed through, for example, insert molding. Insert molding allows the base 30 to contact and adhere to the ring metal core 20 and integrates the base 30 with the ring metal core 20.

The indicator 40 coupled to the coupling portion 31 will now be described.

As shown in FIG. 3, the indicator 40 includes the light emitting units 41, the light guide 50, and the holding member 60. The holding member 60 is elongated in the circumferential direction around the axis L1. The left and right sides of the holding member 60 include bulged portions 61 forming the assisting portions 16 (refer to FIG. 2), respectively. The bulged portions 61 (refer to FIG. 2) are more bulged toward the axis L1 than other portions of the holding member 60.

As shown in FIG. 4, the inner surface of each bulged portion 61 includes a holding portion 62 that holds the corresponding light emitting unit 41. Further, the inner surface of each bulged portion 61 includes a guide 63 that extends from the corresponding light emitting unit 41 to guide the light guide 50. The holding portions 62 and the guides 63 are formed by, for example, rims extending from the inner surfaces of the bulged portions 61. The holding member 60 near each bulged portion 61 includes a through hole 64 that extends through the holding member 60 in the thickness-wise direction.

As shown in FIG. 3, the outer surface of the holding member 60 between the two through holes 64 includes an accommodation portion 65 that is curved and recessed toward the front side (ring metal core 20). The accommodation portion 65 extends in the longitudinal direction (circumferential direction) of the holding member 60.

As shown in FIG. 4, each light emitting unit 41 is positioned and held (fixed) by the corresponding holding portion 62. The ends of the light guide 50 are respectively accommodated in the light emitting units 41, and the guides 63 guide the light guide 50 from the light emitting units 41 to the through holes 64. The light guide 50 is inserted through the through holes 64 from the inner surface of the holding member 60 to the outer surface of the holding member 60. The light guide 50 is arranged in the accommodation portion 65, which is shown in FIG. 3, between the two through holes 64. That is, the light guide 50 is arranged along the outer surface of the holding member 60 between the two through holes 64. The light guide 50 of this example is adhered to the inner surface (curved surface) of the accommodation portion 65 by an adhesive or the like.

In such a manner, a plurality of single components, that is, the light emitting units 41, the light guide 50, and the holding member 60, are unitized to form the indicator 40. Thus, when coupling the indicator 40, the unitized indicator 40 can be used as a single unit. In the holding member 60, the indicator 40 is coupled to the coupling portion 31 of the base 30 by, for example, a snap-fitting structure. The coupling structure of the indicator 40 will be now described in detail.

As shown in FIG. 5, the upper end of the holding member 60 includes a lip 66 fitted to the groove 32 of the coupling portion 31. The lip 66 is elongated in the circumferential direction in correspondence with the groove 32, which is slit-shaped elongated in the circumferential direction. When the holding member 60 is coupled to the coupling portion 31, the lip 66 engages the inner surface of the groove 32 (more specifically, inner surface of groove 32 at lower side).

A projection 67 arranged below the lip 66 of the holding member 60 is fitted to the curved portion 34 of the coupling portion 31. The projection 67 is extended in the circumferential direction in correspondence with the curved portion 34 and is curved and projected toward the ring metal core 20. When, for example, the holding member 60 is coupled to the coupling portion 31, the inner surface of the projection 67 abuts against the outer surface of the curved portion 34. The accommodation portion 65 discussed above is located at a position corresponding to the projection 67.

As shown in FIG. 6, the holding member 60 includes an engagement tab 68 below the projection 67 at a location corresponding to each engagement projection 33 of the coupling portion 31. Each engagement tab 68 upwardly extends from the curved inner surface of the holding member 60. The engagement tabs 68 of this example project toward the front from the middle of the inner surface at the lower side of the holding member 60 and extend in the front-to-rear direction. Each engagement tab 68 includes a distal end provided with an engagement projection 69 that projects toward the ring metal core 20. Each engagement tab 68 includes a basal end configured so that the engagement tab 68 (engagement projection 69) is elastically deformable in the radial direction (vertical direction in FIG. 6) of the ring 13. When the holding member 60 is coupled to the coupling portion 31, the engagement projection 69 of each engagement tab 68 engages the lower end of each engagement projection 33 of the coupling portion 31. This restricts rearward removal of each engagement projection 69.

When the holding member 60 is coupled to the coupling portion 31, the lip 66 (refer to FIG. 5) of the holding member 60 with which the light emitting units 41 and the light guide 50 are unitized is first fitted to the groove 32 and positioned in the vertical direction relative to the coupling portion 31 of the holding member 60. After the positioning, the holding member 60 is pushed toward the front (toward ring metal core 20). This bends each engagement tab 68 toward the lower side of the corresponding engagement projection 33 and moves the holding member 60 toward the front. After each engagement projection 69 moves toward the front of the corresponding engagement projection 33, the shape of each engagement tab 68 is returned so that the engagement projection 69 engages the lower end of the engagement projection 33. This engagement restricts removal of each engagement projection 69 in a direction opposite to the insertion direction and restricts movement of the holding member 60 toward the rear.

In such a manner, the holding member 60 (indicator 40) is coupled to the coupling portion 31 (base 30). The holding member 60 covers the outer surface of the coupling portion 31. Further, as shown in FIG. 7, the light emitting units 41 arranged on the inner surface of the holding member 60 is arranged in the space between the inner surface of the holding member 60 and the outer surface of the ring metal core 20. That is, the light emitting units 41 are arranged at the outer side of the outer surface of the ring metal core 20 (more specifically, radially outer side of ring 13). A heat transmission member 70 thermally connects each light emitting unit 41 to the outer surface of the inner annular portion 22 of the ring metal core 20 located in the corresponding assisting portion 16.

As shown in FIGS. 5 to 7, a soft sheet 71 covers the outer surface of the base 30, which is exposed from the holding member 60. An upholstery layer 72 that covers the outer surface of the soft sheet 71 is wound around the outer surface of the soft sheet 71. The soft sheet 71 is adhered to the outer surface of the base 30 by, for example, an adhesive or a double-sided adhesive tape. The upholstery layer 72 is adhered to the outer surface of the soft sheet 71 by, for example, an adhesive. For example, felt may be used as the soft sheet 71. The material of the upholstery layer 72 may be, for example, natural leather, synthetic leather, or artificial leather.

As shown in FIG. 7, in each assisting portion 16, the soft sheet 71 and the upholstery layer 72 surround the base 30 and the holding member 60 (that is, bulged portion 61). The soft sheet 71 and the upholstery layer 72 located in the assisting portion 16 cover the outer surface of the base 30 and the outer surface of the bulged portion 61. Thus, each light emitting unit 41 arranged on the inner surface of the holding member 60 are covered by the bulged portion 61, the soft sheet 71, and the upholstery layer 72 so that the light emitting unit 41 cannot be seen from the outside.

As shown in FIG. 3, the soft sheet 71 and the upholstery layer 72 include an opening 73. The opening 73 exposes the outer surface of the holding member 60 excluding the bulged portions 61 and the light guide 50 located on the outer surface (more specifically, inner surface of accommodation portion 65). As shown in FIG. 5, each end of the portion of the upholstery layer 72 where the opening 73 is arranged is fitted into the gap between the base 30 and the holding member 60. More specifically, the upper end of the upholstery layer 72 is fitted to and held in a gap between the base 30 and the lip 66 of the holding member 60 in the groove 32. Further, the lower end of the upholstery layer 72 is fitted to and held between the base 30 and the lower end of the holding member 60 in a gap at the lower end of the coupling portion 31.

The light guide 50 arranged in the accommodation portion 65 is exposed to the opening 73 from the base 30, the holding member 60, the soft sheet 71, and the upholstery layer 72. The light guide 50 arranged in the accommodation portion 65 is covered by the cover 17. The cover 17 closes the opening 73. The cover 17 is adhered to the upholstery layer 72 by, for example, an adhesive.

The cover 17 includes a translucent lens 17A and a light blocking member 17B (refer to thick line in FIGS. 5 and 6) that limits a light emission region A1 of light from the light guide 50 out of the ring 13 (driver seat). The material of the lens 17A may be, for example, a transparent or translucent resin material having optical transmissivity at a wavelength used by the light sources 42 (refer to FIG. 2). The material of the lens 17A may be, for example, a polycarbonate resin, a polyethylene terephthalate resin, a methacrylate resin, or an ABS resin. In this specification, "transparent" includes colorless transparency and colored transparency.

The light blocking member 17B (refer to FIGS. 5 and 6) blocks light emitted from the outer surface of the light guide 50. The light blocking member 17B covers part of the surface (inner surface) of the lens 17A (refer to FIGS. 5 and 6). The light blocking member 17B covers a peripheral region that surrounds a portion of the lens 17A opposing the light guide 50 arranged in the accommodation portion 65. When the light guide 50 emits light, the light emitted from the outer surface of the light guide 50 out of the cover 17 through the lens 17A is blocked by the light blocking member 17B. This limits the light emission region A1 (that is, light emission region of indicator 40) of light from the outer surface of the light guide 50 out of the ring 13. See FIG. 5. That is, in this example, the light emission region A1 serves as a region of the lens 17A where the light blocking member 17B is not arranged. In this example, the light emitted from the light guide 50, which is arranged in the accommodation portion 65, is limited to the light emission region A1 by the light blocking member 17B and emitted out of the ring 13 through the lens 17A so that the light emitted from the light guide 50 is recognized by the driver. More specifically, the light guide 50 arranged in the accommodation portion 65, that is, the light guide 50 opposing the cover 17 (lens 17A), functions as an indication portion of the indicator 40.

The light blocking member 17B is formed by, for example, applying light blocking paint or attaching a light blocking sheet, film, or the like. The outer surface of the cover 17 and the outer surface of the upholstery layer 72 serve as the outermost surface of the ring 13 and an ornamental surface of the ring 13.

Figure 8:
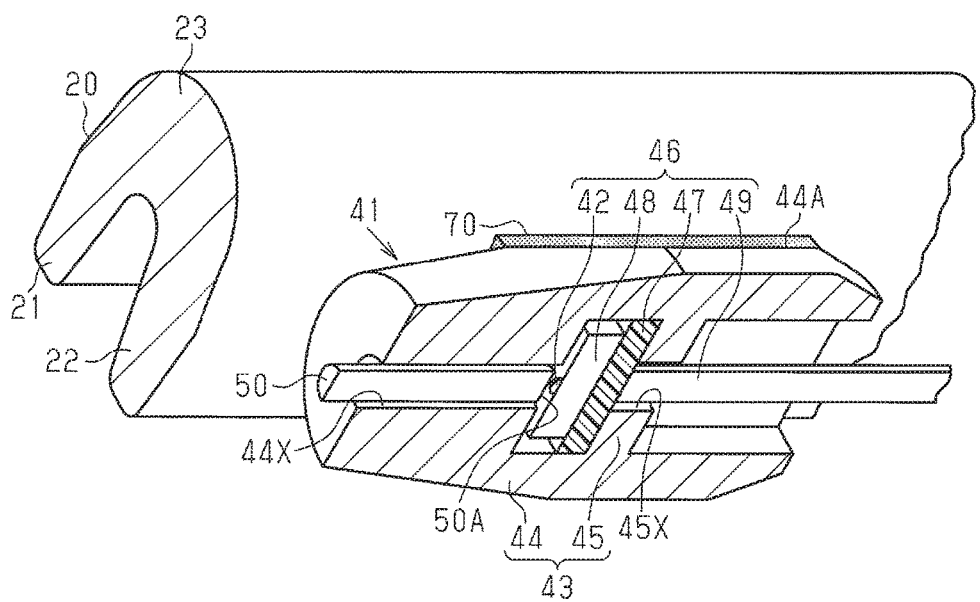
FIG. 8 is a cross-sectional perspective view of an indicator and a ring metal core shown in FIG. 2.

The structures of the light emitting units 41 and the light guide 50 will now be described in detail with reference to FIGS. 8 and 9. First, one example of the structure of each light emitting unit 41 will now be described. FIG. 8 is a cross-sectional perspective view of the right light emitting unit 41 shown in FIG. 2.

Each light emitting unit 41 includes a heat releasing portion 43 and a light emission device 46, which is accommodated in the heat releasing portion 43. The heat releasing portion 43 includes a tubular body 44 and a mounting portion 45 that blocks an opening of the body 44. The body 44 and the mounting portion 45 are integrated with each other. The heat transmission member 70 thermally connects part of the outer surface of the body 44 to the outer surface of the inner annular portion 22 of the ring metal core 20, which is exposed from the base 30 (refer to FIG. 7). The body 44 includes an outer surface 44A opposing the outer surface of the inner annular portion 22. The outer surface 44A corresponds to the shape of the outer surface of the opposed inner annular portion 22 to increase the adhesion with the ring metal core 20. The heat transmission member 70 fills the space between the outer surface 44A of the body 44 and the outer surface of the inner annular portion 22. The heat transmission member 70 reduces contact heat resistance between the heat releasing portion 43 and the ring metal core 20.

The heat releasing portion 43 (body 44 and mounting portion 45) has a larger surface area than the light source 42 and the light emission device 46 and functions to disperse the density of heat generated by the light sources 42. It is preferred that the material of the heat releasing portion 43 have a good thermal conductivity. The material of the heat releasing portion 43 may be, for example, a material having a higher thermal conductivity than the material of the base 30 (refer to FIG. 7). The material of the heat releasing portion 43 may be, for example, aluminum (Al), copper (Cu), silver (Ag), or an alloy of these elements. In the present embodiment, Al is used as the material of the heat releasing portion 43. Further, the material of the heat releasing portion 43 may be, for example, a resin material containing a filler of an inorganic material having a high thermal conductivity (for example, silica, alumina, or boron nitride) or a metal material (for example, silver, copper, or nickel). When the heat releasing portion 43 is formed from such a resin material, the machining efficiency increases. This increases the productivity of the heat releasing portion 43. Further, the material of the heat transmission member 70 may be, for example, a material having a higher thermal conductivity than the material of the base 30 (refer to FIG. 7). The material of the heat transmission member 70 may be, for example, a silicone resin. Further, the material of the heat transmission member 70 may be, for example, a resin binder containing a material having a high thermal conductance such as indium, silicone grease, or metal filler.

The light emission device 46 includes a wiring board 47 mounted on the mounting portion 45, a sub-mount 48 arranged on the wiring board 47, and a signal wire 49 that is electrically connected to each light source 42.

The wiring board 47 is formed by a flat plate of a ceramic material, such as alumina ($AL_2O_3$) or aluminum nitride (AlN), or a glass epoxy resin. The sub-mount 48 may be, for example, a ceramic board of AlN, silicon carbide (SiC), and the like.

Referring to FIG. 8, light source 42 is mounted on the corresponding sub-mount 48 with a light emitting surface (left surface) directed toward a side opposite to the sub-mount 48 (left side). For example, an LED or a semiconductor laser diode may be used as the light source 42. In the present embodiment, LEDs that emit different colors of light are mounted on the sub-mount 48 as the light source 42. The combination of LEDs may be, for example, a combination of three primary colors (RGB) or a combination of white and an incandescent color.

Figure 10:
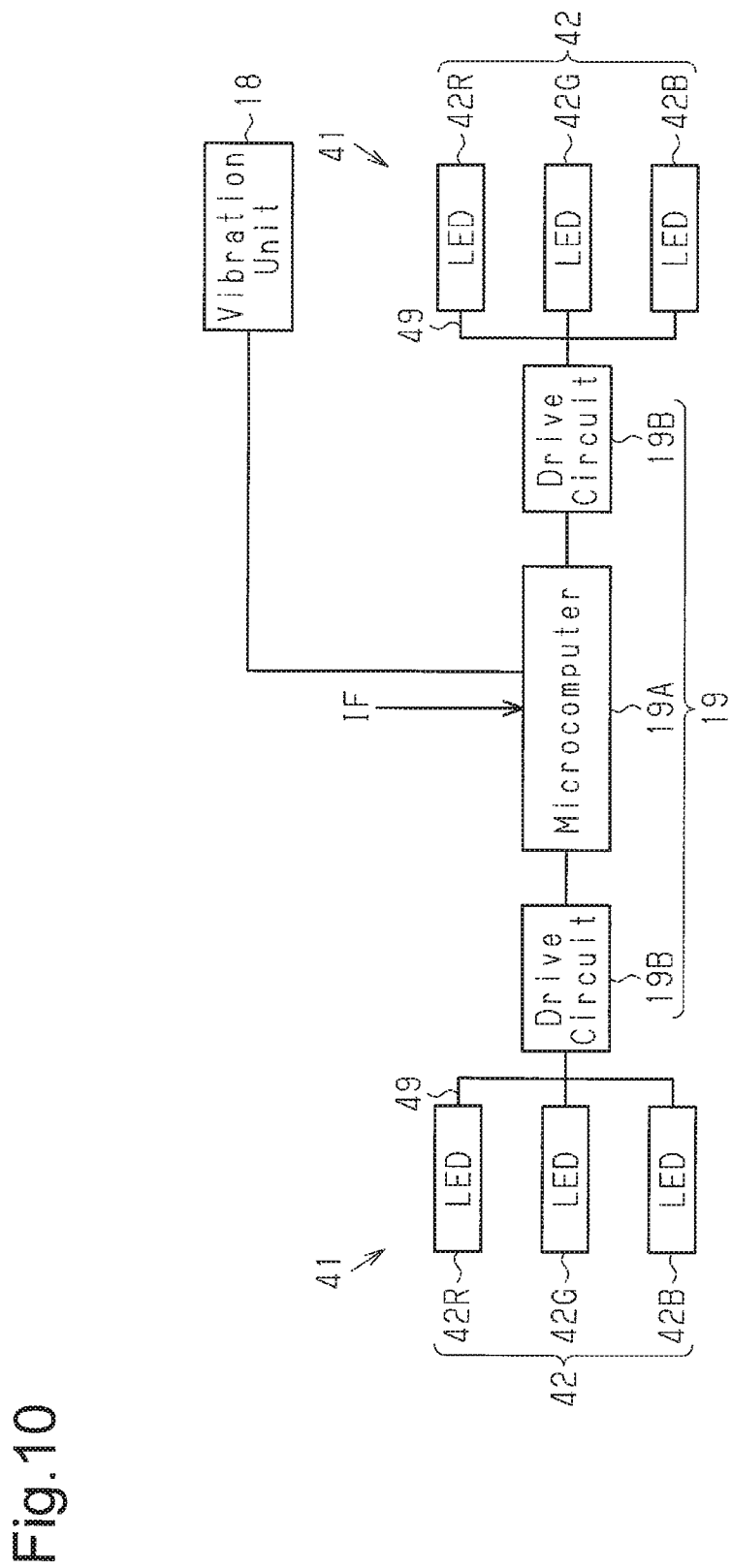
FIG. 10 is a block diagram showing an example of the internal configuration of a control circuit shown in FIG. 2.

As shown in FIG. 10, the light source 42 of each light emitting unit 41 of this example includes three LED chips that respectively emit three primary colors, namely, a red LED chip 42R, a green LED chip 42G, and a blue LED chip 42B. That is, the two light emitting units 41 each include the red LED chip 42R, the green LED chip 42G, and the blue LED chip 42B. Thus, in each of the two light emitting units 41, the emitting light of each of the LED chips 42R, 42G, and 42B are mixed to obtain the emitting light of a desired color.

The signal wire 49 shown in FIG. 8 is inserted into a through hole 45X that extends through the mounting portion 45 in the thickness-wise direction. The signal wire 49 is electrically connected to the light source 42 by, for example, a wiring pattern (not shown) on the wiring board 47 and an electrode (not shown) on the sub-mount 48. The signal wire 49 is electrically connected to the control circuit 19 (refer to FIG. 10) that controls the light emission mode of the light from the corresponding light source 42.

Further, a guide hole 44X extends through the body 44 of the light emission device 46 at the left side in FIG. 8. The guide hole 44X is located at a position opposing the light source 42. The guide hole 44X accommodates the corresponding end 50A of the light guide 50. The light guide 50 is accommodated in the guide hole 44X with the end 50A opposed to the light source 42.

In each light emitting unit 41 having the above structure, the heat generated by the light source 42 is dispersed to the heat releasing portion 43 (mounting portion 45 and body 44) through the sub-mount 48 and the wiring board 47. Then, the heat is transmitted to the ring metal core 20, which has a large surface area, and is then released. The heat releasing portion 43 is formed from a material having a high thermal conductance and has a larger surface area than the light emission device 46. This allows the heat of each light source 42 to be efficiently released and limits increases in the temperature of each light source 42.

Further, the light emitted from the light emitting surface of the light sources 42 enters the light guide 50 from the ends 50A of the light guide 50. The light guide 50 will now be described in detail.

As shown in FIG. 9A, the light guide 50 is curved extending in the circumferential direction in a front view between the two light emitting units 41 (two light sources 42). As described above, the portion of the light guide 50 arranged in the accommodation portion 65 functions as the indication portion of the indicator 40. More specifically, the light guide 50 in the accommodation portion 65 includes a rear surface 50B that is a driver side surface and functions as the indication portion of the indicator 40.

The light guide 50 is formed from, for example, a translucent synthetic resin such as acrylic resin or polycarbonate resin. For example, the light guide 50 may be formed by a plurality of members and have a layer structure in which the members are stacked in a concentric manner. Alternatively, the light guide 50 may be formed by a single member that does not have a layer structure. In the present embodiment, a light guide rod having a double-layer structure with superior flexibility is used as the light guide 50.

As shown in FIG. 9B, the light guide 50 of this example includes a core layer 51 that serves as a core and a clad layer 52 that covers the core layer 51 and has a lower refractive index than the core layer 51. The core layer 51 has a circular cross section. The clad layer 52 covers the entire surface of the core layer 51. The material of the core layer 51 and the clad layer 52 may be, for example, a resin material having optical transmissivity at a wavelength used by the light sources 42. FIGS. 5, 6, 8, and the like each show only the core layer 51 among the core layer 51 and the clad layer 52.

The middle portion of the light guide 50 in the longitudinal direction (circumferential direction) includes recesses 53. The recesses 53 are spaced apart from one another in the longitudinal direction of the light guide 50. The recesses 53 are arranged in the light guide 50 that serves as the indication portion, more specifically, in the rear surface 50B of the light guide 50 accommodated in the accommodation portion 65 (refer to FIG. 9A).

The recesses 53 are each shaped so that light propagating through the core layer 51 can be emitted out of the light guide 50. That is, each recess 53 extends in the front-to-rear direction through the clad layer 52 from the rear surface 50B of the clad layer 52 to the core layer 51. The bottom surface of each recess 53 is located at an intermediate position in the core layer 51 in the front-to-rear direction. In such a manner, the recesses 53 of this example extend in the front-to-rear direction. The shape of each recess 53 is cylindrical but may be prismatic, conical, or pyramidal. The recesses 53 can be formed through, for example, machining, laser processing, sandpaper processing, or pressing.

The light that enters the light guide 50 through the ends 50A is repeatedly reflected internally between the core layer 51 and the clad layer 52 and guided in the longitudinal direction of the light guide 50, and the light slightly leaks out of the outer surface of the clad layer 52. Thus, the light propagating between the core layer 51 and the clad layer 52 (that is, in light guide 50) attenuates as the light travels farther from the light sources 42 in the longitudinal direction of the light guide 50. Some of the light propagating through the light guide 50 is reflected by the inner surface of each recess 53 and emitted out of the light guide 50. The amount of light emitted from the recesses 53 is larger than the amount of light emitted from the outer surface of the light guide 50 (clad layer 52). Thus, each recess 53 has a higher brightness than other portions of the light guide 50. As a result, the recesses 53 emit light more brightly than other portions. The amount of the light emitted from the recesses 53 increases in proportion to the surface areas of the recesses 53.

Accordingly, the brightness at each recess 53 can be adjusted by adjusting the surface area of each recess 53. When the recesses 53 are arranged, the light propagating through the light guide 50 greatly attenuates. Thus, the light guide distance in the light guide 50 becomes shorter than when there are no recesses 53. In addition, as the surface area of each recess 53 increases, the amount of the light emitted from the recesses 53 (that is, attenuation amount of light propagating through light guide 50) increases. Thus, the light guide distance in the light guide 50 becomes short. Accordingly, the light guide distance in the light guide 50 can be adjusted by changing the surface area of each recess 53 and the number of the recesses 53.

Thus, the number of the recesses 53 and the surface area of each recess 53 are set in accordance with, for example, the amount of light from the light sources 42 and the light guide distance in the light guide 50. For example, the recesses 53 may have different surface areas. In this example, the recesses 53 that are farther from the light sources 42 have larger surface areas. For example, the recesses 53 that are farther from the light sources 42 are increased in at least one of width and depth. Such a setting allows the amount of the light emitted from each recess 53 (brightness at each recess 53) to be approximately the same regardless of the distance from the light sources 42.

The setting location of the light guide 50 will now be described.

As shown in FIGS. 5 and 6, the light guide 50 in the accommodation portion 65 (that is, light guide 50 serving as indication portion) is arranged only at the lower side of a top 13T (refer to chain line in FIG. 2) of a driver seat side surface 13A of the ring 13 (located closer to boss 14 (refer to FIG. 2) that is most projected to the driver seat side (rear side). Thus, the ring 13 (particularly, upholstery layer 72 forming top 13T) located upward from the light guide 50 functions as a shield of the light guide 50. This reduces the ambient light that directly strikes the light guide 50. Further, the light guide 50 of this example is located at the side (front side) of the top 13T opposite to the driver. One example of a setting location of the light guide 50 at the uppermost side in the steering reference state of the steering wheel 12, that is, the light guide 50 shown in FIG. 5, will now be described.

Figure 11:
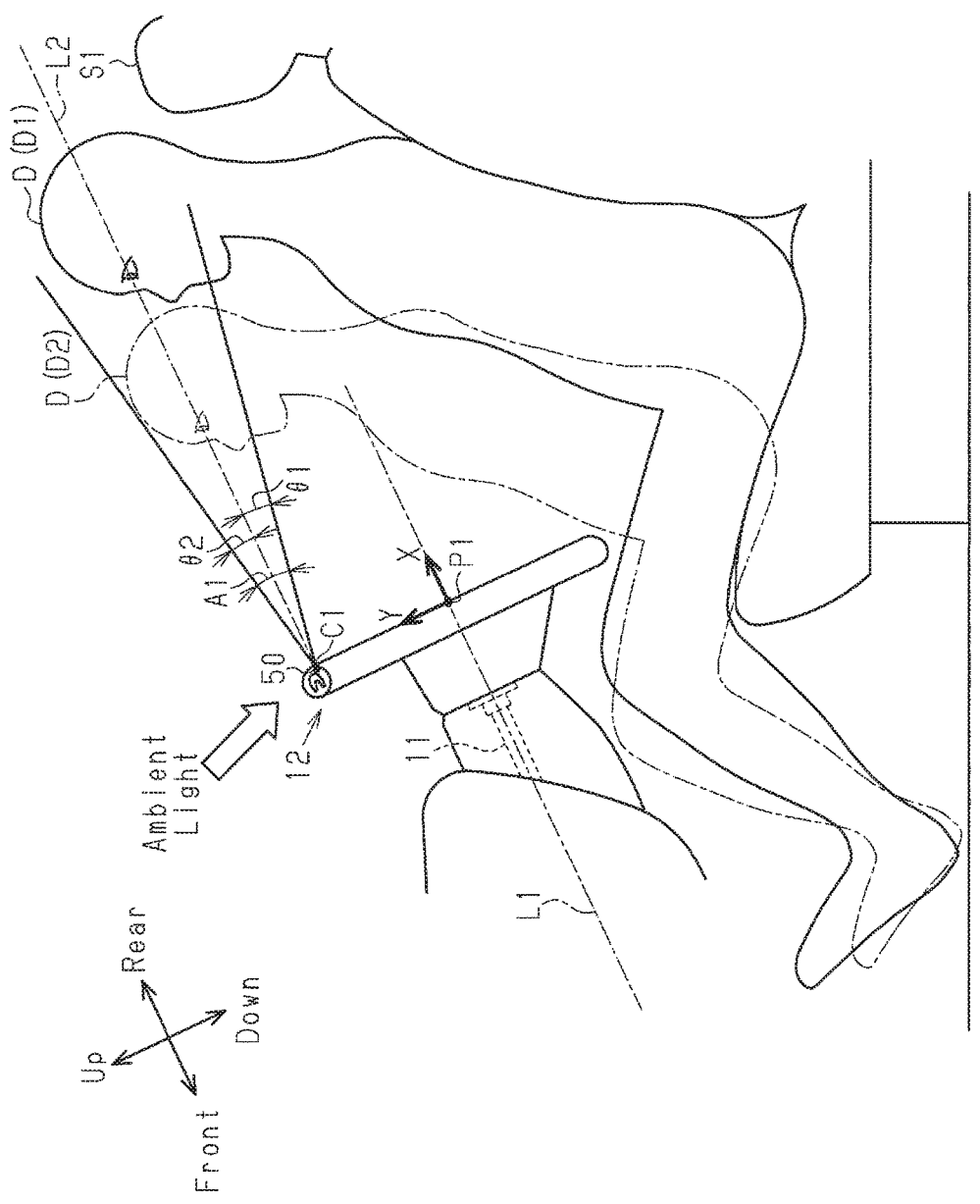
FIG. 11 shows a light emission region of the indicator of FIG. 2.

As shown in FIG. 11, the X axis extends along the axis L1 of the steering shaft 11, that is, the front-to-rear direction of the steering wheel 12, and the Y axis extends in the vertical direction of the steering wheel 12. The point on the driver side surface of the steering wheel 12 that intersects the axis L1 is set as the origin P1, and the coordinates (X, Y) of the origin P1 is set to (0, 0).

When the diameter of the steering wheel 12 is 360 mm, the light guide 50 located at the uppermost side of the steering wheel 12 is arranged so that the center C1 of the light guide 50 in the front-to-rear direction is located at, for example, the coordinates of (−5, 165). That is, in this case, the center C1 of the light guide 50 is located 5 mm toward the front from the origin P1 and 165 mm above the origin P1. When the diameter of the steering wheel 12 is 380 mm, the light guide 50 located at the uppermost side of the steering wheel 12 is arranged so that the center C1 of the light guide 50 is located at, for example, the coordinates of (−5, 175). The location of the light guide 50 that functions as the indication portion in the circumferential direction is based on the center C1. More specifically, the light guide 50 that functions as the indication portion is arranged on a circle that extends through the center C1 and around the axis L1. When the light guide 50 is located at the above position, the entire light guide 50 that functions as the indication portion is located at the lower and front sides of the top 13T.

The center C1 of the light guide 50 may be located approximately 3 mm to 8 mm toward the front from the origin P1. Further, the center C1 of the light guide 50 is located above the origin P1 at a position separated from the origin P1 by a distance that is shorter than the radius of the steering wheel 12 by approximately 13 mm to 18 mm.

The light emission region A1 will now be described.

The light emission region A1 is set, for example, so that the entire light emission region A1 is included in the field of view of the driver D who sits in the driver seat S1. For example, the light emission region A1 is set so that the entire light emission region A1 is included in the field of view of the driver D when the driver D who is properly sitting in the driver seat S1 looks at the light guide 50 (cover 17) located at the uppermost side. The light emission region A1 may be set based on a virtual line connecting the center C1 of the light guide 50 and the eyes of the driver D (for example, eyes of drivers D1 and D2 that have different physical builds) properly sitting in the driver seat S1. In the present embodiment, the virtual line connecting the eyes of the driver D and the center C1 of the light guide 50 defines a virtual line L2 that is substantially parallel to the axis L1. More specifically, the virtual line L2 defines a virtual line connecting the center C1 of the light guide 50 and the eyes of the driver D1 who is tall (particularly, when seated) (for example, AM50 dummy). Further, the virtual line L2 defines a virtual line connecting the center C1 of the light guide 50 and the eyes of the driver D2 who is short (particularly, when seated) (for example, AF05 dummy). In the present embodiment, the light emission region A1 is set about the virtual line L2.

More specifically, the light emission region A1 is set about the virtual line L2 in which the angle θ1 from the virtual line L2 toward the axis L1 (lower side in FIG. 11) is in the range from 10° to 40° (preferably, 10° to 20°, more preferably, 10°) and the angle θ2 from the virtual line L2 toward the side opposite to the axis L1 (upper side in FIG. 11) is in the range from 10° to 25° (preferably, 10° to 15°, more preferably, 10°). Further, the light emission region A1 is set so that the angle θ2 is smaller than or equal to the angle θ1. When the light emission region A1 is set in such a manner, the light emission region A1 is included in the field of view of the driver D (drivers D1 and D2). This allows the driver D to recognize the illuminated state of the light guide 50 in a preferred manner.

Figure 12:
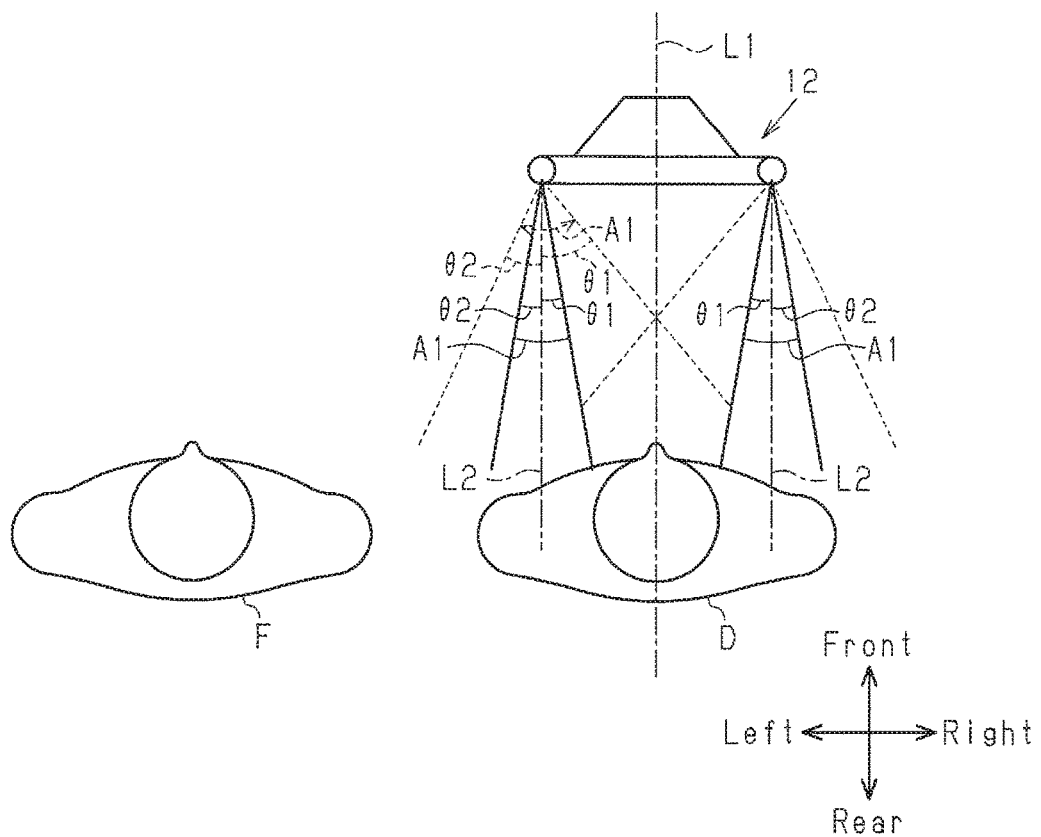
FIG. 12 shows the light emission region of the indicator of FIG. 2.

The light emission region A1 is set in the same manner over the entire length of the light guide 50 arranged in the accommodation portion 65 (refer to FIG. 5). More specifically, as shown in FIG. 12, in the light guide 50 fixed to the accommodation portion 65 (refer to FIG. 5), the light emission region A1 is set about the virtual line L2 that is parallel to the axis L1 and extends through the center of the light guide 50 in the front-to-rear direction at each location. That is, in this case, the light emission region A1 is set so that the angle θ1 from the virtual line L2 toward the axis L1 is in the range from 10° to 40° (preferably, 10° to 20°, more preferably, 10°) and the angle θ2 from the virtual line L2 toward the side opposite to the axis L1 is in the range from 10° to 25° (preferably, 10° to 15°, more preferably, 10°). Further, the light emission region A1 is set so that the angle θ2 is smaller than or equal to the angle θ1.

When the light emission region A1 is set to the narrowest range (i.e., range of 20° about virtual line L2) (refer to solid line), the light emission region A1 in the horizontal direction (sideward direction in FIG. 12) is limited to a narrow region. This limits situations in which the light emission region A1 is included in the field of view of, for example, a front-seat passenger F.

When the light emission region A1 is set to the widest range (refer to broken line), the angle θ1 from the virtual line L2 toward the axis L1 is set to 40° and the angle θ2 from the virtual line L2 toward the side opposite to the axis L1 is set to 25°. That is, in this case, the light emission region (range) from the virtual line L2 at the side opposite to the axis L1 is narrower than the light emission region (range) from the virtual line L2 at the side closer to the axis L1. Thus, even when the light emission region A1 is set to the widest range, the light emission region A1 is not extended toward the front-seat passenger F. Accordingly, the front-seat passenger F cannot easily recognize the illuminated state of the light guide 50. In such a manner, the light emission region A1 is set to a range in which vehicle occupants other than the driver D do not recognize the illuminated state of the light guide 50.

The light emission modes of the light sources 42 and one example of the internal configuration of the control circuit 19 that controls the vibration unit 18 will now be described with reference to FIG. 10.

The control circuit 19 separately controls the two light sources 42 and includes a microcomputer 19A, which controls the vibration unit 18 and drive circuits 19B, which respectively drive the light sources 42 based on a control signal from the microcomputer 19A. The microcomputer 19A is supplied with power used to generate light with the control circuit 19 and the light sources 42. Further, the microcomputer 19A is provided with information IF related to information shown on the indicator 40. The information IF includes, for example, information related to autonomous driving of a vehicle including the steering wheel 12 (refer to FIG. 1), the vehicle speed, the engine speed, and the vehicle interior temperature. The information related to autonomous driving includes, for example, information indicating that the vehicle is undergoing autonomous driving, information indicating whether or not autonomous driving can be performed, such as the communication condition and presence of lane lines, the rotation direction and the rotation angle of the steering wheel 12, and gearshift position information. The microcomputer 19A generates a control signal that controls the light emission modes (for example, amount of light and color) of the two light sources 42 (red LED chip 42R, green LED chip 42G, and blue LED chip 42B) based on the received information IF. Further, the microcomputer 19A generates a control signal that drives and controls the vibration unit 18 based on the received information IF.

Each drive circuit 19B separately drives the red LED chip 42R, the green LED chip 42G, and the blue LED chip 42B based on a control signal from the microcomputer 19A. This allows the light guide 50 (refer to FIG. 3) to emit light in a predetermined mode when at least one of the LED chips 42R, 42G, and 42B emits light. The indicator 40 (refer to FIG. 3) uses the illumination mode of the light guide 50 to present predetermined vehicle information (for example, information related to autonomous driving of vehicle).

One example of the illumination modes of the light sources 42 and the light guide 50 will now be described with reference to FIGS. 13 and 14.

Figure 13A:
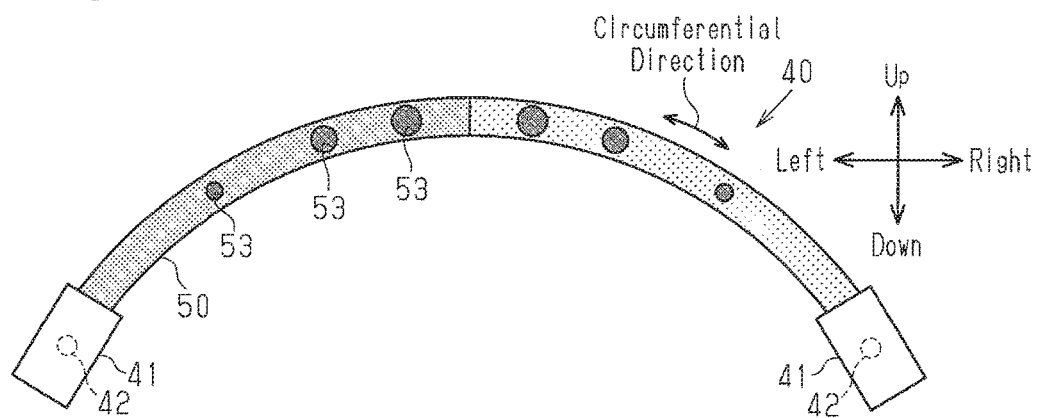
FIGS. 13A to 13C each show an illumination mode of the indicator of FIG. 2.

In the indicator 40 shown in FIG. 13A, different colors of light are respectively emitted from the left light source 42 and the right light source 42 under the control of the control circuit 19. For example, blue light is emitted from the left light source 42, and green light is emitted from the right light source 42. In the light guide 50, the blue light emitted from the left light source 42 enters the left end, and the green light emitted from the right light source 42 enters the right end. In the light guide 50, the blue light propagates from the left end toward the right end, and the green light propagates from the right end toward the left end. Thus, blue light is emitted from the outer surface of the light guide 50 proximate to the left light source 42, and the light guide 50 proximate to the left light source 42 is illuminated by blue light. Further, green light is emitted from the outer surface of the light guide 50, and the light guide 50 proximate to the right light source 42 is illuminated by green light. In the illustrated example, the control circuit 19 controls the amount of light from each light source 42 so that the light guide distance in the light guide 50 is approximately one-half of the entire length of the light guide 50. As shown in FIG. 13A, this generates a boundary between the blue light and the green light at the middle of the light guide 50 in the longitudinal direction (circumferential direction). When controlling the amount of the different colors of light emitted from the right and left light sources 42 in such a manner, the color boundary may easily be generated. The light that enters the light guide 50 attenuates as the light becomes farther from the light sources 42 in the longitudinal direction of the light guide 50 (that is, as light from each light source 42 approaches color boundary). Thus, the brightness at the light guide 50 decreases as the light approaches the color boundary. However, the emitted amount of light (amount of light) is concentrated at the recesses 53 of the light guide 50. Thus, each recess 53 has a higher brightness than other portions of the light guide 50. This improves the visibility of the light guide 50 in the recesses 53.

Figure 13B:
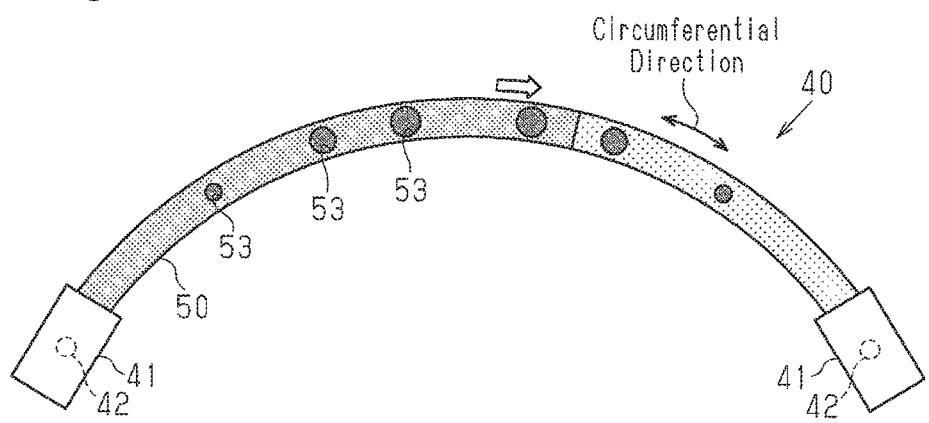
Figure 13C:
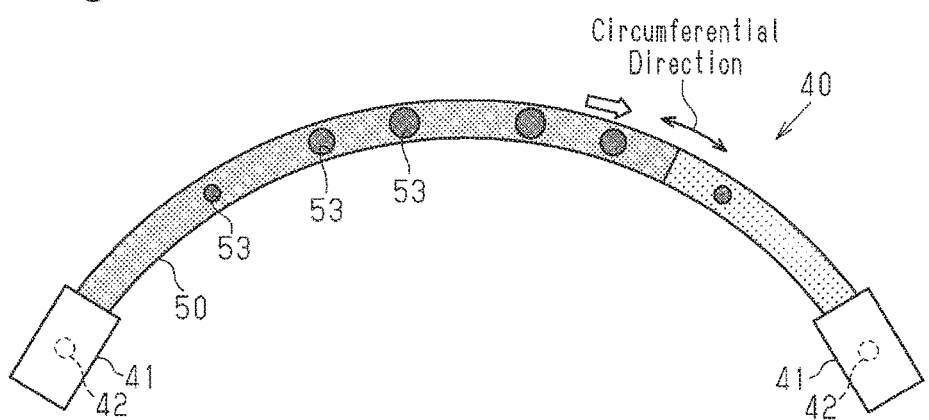

From the illuminated state shown in FIG. 13A, when gradually decreasing the amount of light from the right light source 42 and gradually increasing the amount of light from the left light source 42, the illuminated region of the light guide 50 over which blue light is emitted is gradually enlarged toward the right light source 42 (toward right side) as shown in FIGS. 13B and 13C. Such changes in the light emission mode (amount) of the light from each light source 42 change the ratio of the illuminated region of the light guide 50 over which blue light is emitted and the illuminated region of the light guide 50 over which green light is emitted. That is, the color boundary can be moved by changing the amount of light from each light source 42. This produces a flow of light in the indication portion (light guide 50).

In the above illumination modes, the two light sources 42 emit different colors of light. However, the two light sources 42 may emit the same color of light so that the entire light guide 50 emits a single color of light. In this case, the light amount of each light source 42 may be smaller than when illuminating the entire light guide 50 with a single light source 42.

Figure 14A:
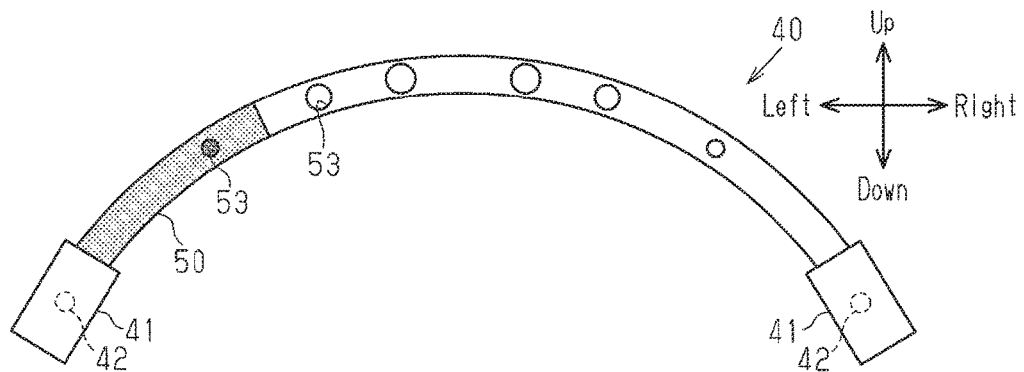
FIGS. 14a to 14C each show an illumination mode of the indicator of FIG. 2.

Further, in the indicator 40 shown in FIG. 14A, a predetermined color (blue in this example) of light is emitted from only one of the two light sources 42 (left light source 42 in this example). The blue light emitted from the left light source 42 enters the left end of the light guide 50 and propagates through the light guide 50. Thus, the blue light is emitted from the light guide 50 that is proximate to the left light source 42, and the light guide 50 is illuminated by blue light.

Figure 14B:
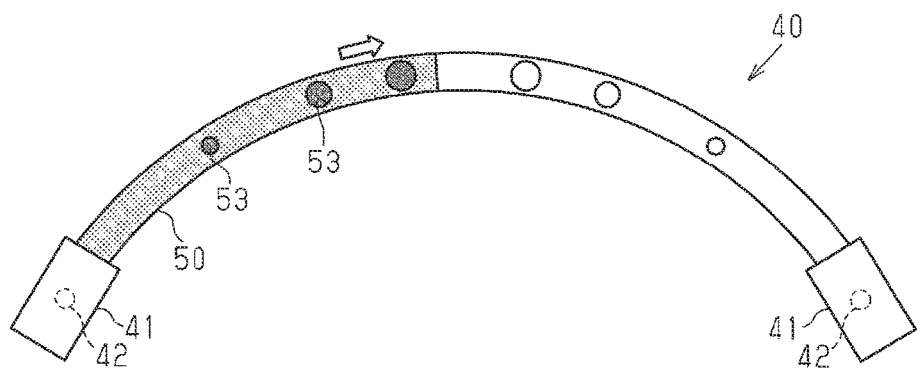
Figure 14C:
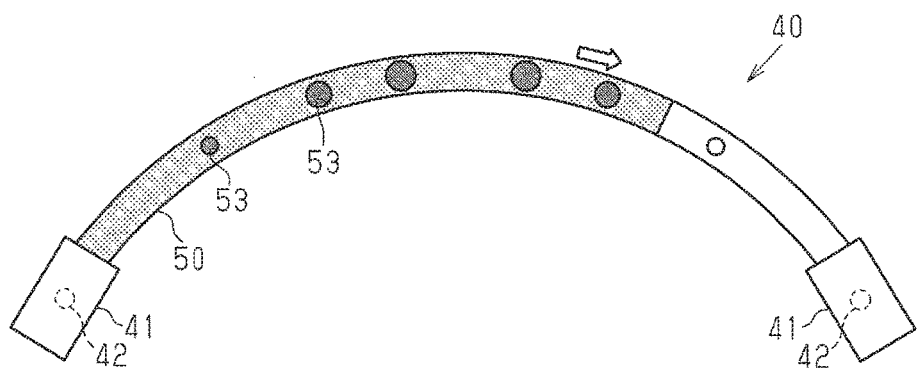

When gradually increasing the light amount of the left light source 42 from the illuminated state shown in FIG. 14A, the illuminated region over which blue light is emitted is gradually enlarged toward the right side as shown in FIGS. 14B and 14C. When the light amount of the light source 42 is changed in such a manner, the illuminated region of the light guide 50 can be enlarged and reduced. This produces a flow of light in the indication portion (light guide 50).

In any one of the illumination modes shown in FIGS. 13 and 14, the brightness at the light guide 50 can be changed by changing the light amount of the light sources 42. Further, the color of light emitted from the light guide 50 can be changed by changing the color of light emitted from the light sources 42. In addition, the light guide 50 can be intermittently illuminated by repeatedly activating and deactivating the light sources 42.

As described above, the control circuit 19 controls the light emission mode (amount of light, color, and the like) of each light source 42 to change the color, the brightness, the intermittent illumination, and the illuminated region of the light guide 50. Further, a flow of light can be produced in the light guide 50. In such a manner, when changing the illumination mode, that is, the color, the brightness, the intermittent illumination, and the illuminated region of the light guide 50, and the flow of light, the steering wheel 12 presents various types of vehicle information. For example, when presenting warning information indicating a hazard to the vehicle, the extent and direction of the hazard can be notified by changing the color, the brightness, the intermittent illumination, the illuminated region of the light guide 50, and the flow of light. Further, the necessary steering angle of the steering wheel 12 may be presented by producing the flow of light when, for example, parking the vehicle. In addition, the flow of light may be used to prompt the driver to look at, for example, an instrument panel of the vehicle.

When warning information or the like is presented, the vibration unit 18 may be driven and controlled to vibrate the steering wheel 12 in accordance with the illumination mode of the light guide 50. In this case, even if, for example, the driver is not looking at the steering wheel 12 during autonomously driving, the driver will notice the vibration of the steering wheel 12. When the illumination of the light guide 50 and the vibration of the steering wheel 12 are combined in such a manner, the warning information will be recognized only by the driver without, for example, any warning sound.

The present embodiment has the advantages described below.

(1) The illuminated portion of the indicator 40 includes the light sources 42 and the light guide 50. The employment of the light guide 50 allows for the illumination of a wide range with a small number of the light sources 42. This reduces the number of the light sources 42.

For example, when the light guide 50 is omitted and the light sources 42 are arranged in the circumferential direction of the ring 13, a large number of the light sources 42 would be required. In particular, when changing the color of light with the light sources 42, at least two types (two colors) of light sources 42 need to be arranged at each location where light is emitted. This increases the number of the light sources 42, the space occupied by the light sources 42, and the power consumption of the indicator 40.

When the light guide 50 is used, the color of the light that the light guide 50 emits may be changed with only two types (two colors) of the light sources 42 in the light emission device 46. Thus, the number of the light sources 42 is much smaller than when using the light sources 42 as the indication portion. This reduces the cost of the steering wheel 12 and the power consumption of the indicator 40. This further reduces the space occupied by the light sources 42.

(2) Usually, the light guide 50 is illuminated in a substantially even manner over the entire length. However, in this case, the light guide 50 illuminated in the substantially even manner has a low brightness. This may significantly reduce the visibility of the light guide 50 when the ambient light is strong.

In the present embodiment, the rear surface 50B serving as the driver seat side surface of the light guide 50 includes the recesses 53 that are shaped so that light propagating through the light guide 50 is emitted out of the light guide 50. Thus, when the light sources 42 emit light, more light is emitted from the recesses 53 than other portions of the light guide 50. Thus, the brightness at each recess 53 is higher than other portions of the light guide 50. This brightly illuminates the recesses 53 and thus improves the visibility of the light guide 50 because of the recesses 53.

(3) The arrangement of the recesses 53 allows for bright local illumination of the recesses 53 and uneven illumination of the light guide 50. Accordingly, the illumination modes of the light guide 50 can be changed by changing the number and locations of the recesses 53. This increases the illumination patterns of the light guide 50.

(4) When the recesses 53 are omitted, the light guide 50 is illuminated in a substantially even manner over the entire length as described above. Thus, in such a case, even when the two light sources 42 emit different colors of light, the two colors of light would be mixed over the entire length of the light guide 50, and it would be difficult to generate a boundary of the two colors.

The light guide distance in the light guide 50 can be adjusted by the arrangement of the recesses 53. More specifically, since the amount of light emitted from each recess 53 (that is, attenuation amount of light propagating through light guide 50) increases in proportion to the surface area of the recess 53, the light guide distance in the light guide 50 can be adjusted by adjusting the surface area of each recess 53 (diameter and depth of recess 53) and the number of the recesses 53. For example, the light guide distance in the light guide 50 can be reduced by increasing the surface area of each recess 53. When different colors of light are emitted from the two light sources 42, such a reduction in the light guide distance allows a boundary of the two colors to be generated in a preferred manner.

(5) The LED chips 42R, 42G, and 42B are used as the light sources 42. This increases the illumination patterns of the light guide 50.

(6) The left light source 42 (first light source) and the right light source 42 (second light source) are configured to emit different colors of light. This allows the light guide 50 to emit two colors of light like in, for example, the illumination modes shown in FIG. 13 and generate a boundary of two colors in the light guide 50.

(7) The control circuit 19 controls the light emission modes (light amount and color) of the light emitted from each light source 42. Thus, the color of the light emitted from the light guide 50 and the illuminated region can be changed. Further, there is a variety of illumination patterns of the light guide 50. For example, the flow of light can be produced in the light guide 50 by sequentially changing (enlarging or reducing) the illuminated regions of the light guide 50.

(8) The light emitting units 41 (heat releasing portions 43 and light emission devices 46) are arranged in the assisting portions 16 that are more bulged toward the boss 14 than other portions of the ring 13. This limits changes in the shape of the ring 13 and easily ensures the space occupied by the light emitting units 41. Thus, a light source that emits a large amount of light may be used as the light source 42. This sufficiently ensures the light guide distance and brightness of the light guide 50. Further, since the changes in shape of the ring 13 that would be caused by the arrangement of the light emitting units 41 are limited, deterioration of the aesthetic appeal of the ring 13 is limited.

(9) The light sources 42 can be arranged at locations (that is, at assisting portions 16) proximate to the light guide 50 that functions as the indication portion. Thus, the light guide distance in the light guide 50 is shorter than when arranging the light sources 42 at locations farther from the light guide 50 that functions as the indication portion. This allows the light sources 42 to emit less light and be reduced in size.

(10) The light emitting units 41 are covered by the bulged portions 61 of the holding member 60, the soft sheet 71, and the upholstery layer 72 so that the light emitting units 41 cannot be seen from the outside. This further limits deterioration of the aesthetic appeal of the ring 13 that would be caused when the light emitting units 41 are arranged.

(11) The light emission device 46, which includes the light sources 42, is thermally connected to the heat releasing portion 43, which is formed from a material having a higher thermal conductance than the base 30 and which has a larger surface area than the light emission device 46. The heat releasing portion 43 is thermally connected to the ring metal core 20. Thus, the heat generated by the light sources 42 is first dispersed to the heat releasing portion 43 and then transmitted to and released from the ring metal core 20 that has a larger surface area than the heat releasing portion 43. Since the heat releasing portion 43 is formed from a material having a higher thermal conductance than the base 30, the heat generated by the light sources 42 is released more efficiently by the heat releasing portion 43 and the ring metal core 20 than when mounting the light sources 42 on the base 30. Further, the heat releasing portion 43 has a larger surface area than the light emission device 46. Thus, the heat generated by the light sources 42 is released more efficiently by the heat releasing portion 43 and the ring metal core 20 than when directly mounting the light emission device 46 on the ring metal core 20. This limits thermal degradation of the light sources 42 and the peripheral components.

(12) The light guide 50 that functions as the indication portion is arranged only in the region closer to (at the lower side of) the boss 14 than the top 13T of the driver seat side surface 13A of the ring 13. Thus, the ring 13 (particularly, ring 13 forming top 13T) located upward from the light guide 50 functioning as the indication portion functions as a shield. This reduces ambient light that directly strikes the light guide 50. As a result, the visibility of the light guide 50 is improved.

(13) The cover 17 includes the light blocking member 17B that limits the light emission region A1 of light out of the ring 13 from the light guide 50. The light blocking member 17B allows the light emission region A1, that is, the light emission region of the indicator 40, to be easily set to a desired shape and a desired range.

Other Embodiments

The above embodiment may be modified as follows.
Light Emitting Unit 41
The light emitting unit 41 is not limited to the structure shown in FIG. 8. For example, a lens that collects light emitted from the light source 42 may be arranged between the light source 42 and the end 50A of the light guide 50. Further, the structures of the wiring board 47 and the sub-mount 48 that mount the light source 42 may be changed. In the above embodiment, the heat releasing portion 43 entirely covers the light source 42, the wiring board 47, the sub-mount 48, and the like of the light emission device 46. Instead, the heat releasing portion 43 may partially expose the light source 42, the wiring board 47, the sub-mount 48, and the like.

The heat transmission member 70 may be omitted so that the outer surface of the heat releasing portion 43 is in direct contact with the outer surface of the inner annular portion 22 of the ring metal core 20.

In the above embodiment, the heat releasing portion 43 is separate from the ring metal core 20. Instead, for example, the heat releasing portion 43 may be formed integrally with the outer surface of the inner annular portion 22 of the ring metal core 20. In this case, for example, the light emission device 46 is accommodated in an accommodation portion that is defined by the outer surface of the inner annular portion 22 of the ring metal core 20 and the inner surface of the heat releasing portion 43. More specifically, the mounting portion 45 is arranged in the accommodation portion, and the light emission device 46 is arranged in the mounting portion 45. When such a structure is used, there is no contact heat resistance between the heat releasing portion 43 and the ring metal core 20. Thus, the heat generated by the light source 42 is effectively released by the heat releasing portion 43 and the ring metal core 20.

The heat releasing portion 43 may be omitted from the light emitting unit 41. In this case, for example, the light emission device 46 may be directly joined with the ring metal core 20. Further, the base 30 may surround the ring metal core 20 in the assisting portion 16, and the light emission device 46 may be joined with the base 30.

The light emitting unit 41 does not have to be arranged in the assisting portion 16. For example, the light emitting unit 41 may be arranged in the boss 14. In this case, the heat releasing portion 43 of the light emitting unit 41 may be thermally connected to a metal core located in the boss 14.

A light source that emits only a single color of light may be used as each light source 42. In this case, light sources that emit the same color of light may be used as the two light sources 42. Alternatively, light sources that emit different colors of light may be used as the two light sources 42.

One of the two light sources 42 may be omitted.

Typically, LEDs are used as the light sources 42 like in the above embodiment. However, LEDs do not have to be used. Instead, for example, laser diodes or the like may be used as the light sources 42.

Light Guide 50
The light guide 50 may be a light guide having a non-circular cross-sectional shape (e.g., cross-sectional shape of a polygon such as a rectangle, an oval, and a semicircle).

Figure 15:
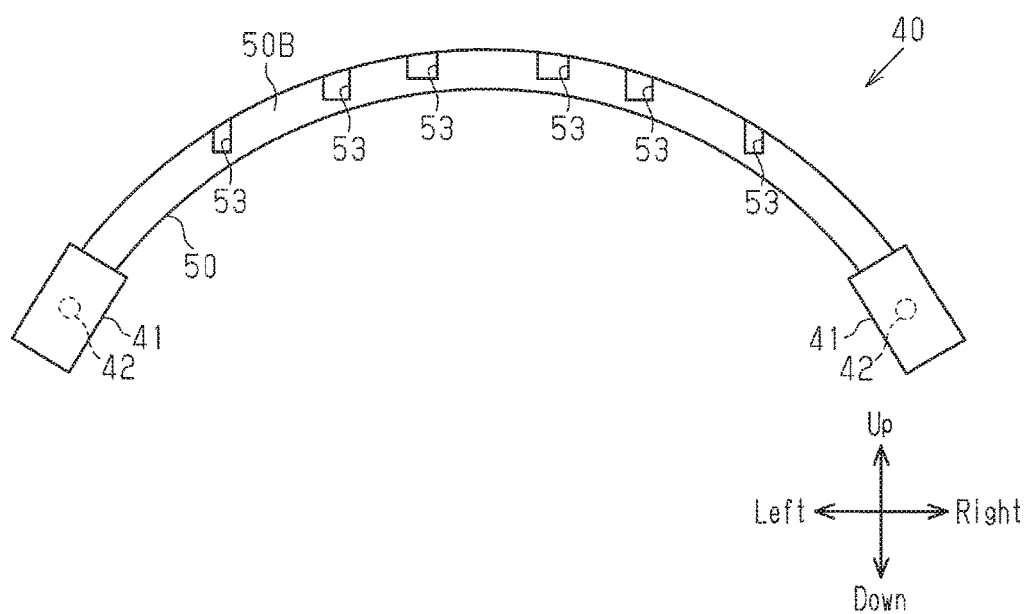
FIG. 15 is a front view showing light emitting units and a light guide of a modified example.

In the above embodiment, the recesses 53 in the light guide 50 extending in the front-to-rear direction is arranged in the rear surface 50B. Instead, for example, as shown in FIG. 15, the recesses 53 extending in the vertical direction may be arranged in the rear surface 50B of the light guide 50. In this case, the recesses 53 extend in a linear manner in the vertical direction as viewed from the driver seat. Thus, when the light sources 42 emit light, the recesses 53 may emit light in a linear manner as viewed from the driver seat.

The number of the recesses 53 in the light guide 50 may differ from that of the above embodiment. Further, the dimension of each recess 53 (diameter and depth of recess 53) may differ from that of the above embodiment. For example, the recesses 53 may all have the same dimension.

The recesses 53 may be omitted from the light guide 50.

The length of the light guide 50 may differ from that of the above embodiment. For example, the light guide 50 may have an annular shape and extend along the entire circumference of the ring 13.

The light guide 50 does not have to be curved as viewed from the driver seat. Instead, for example, the light guide 50 may have a linear shape.

In the above embodiment, the light guide 50 arranged in the outer surface of the holding member 60 is adhered to the inner surface of the accommodation portion 65 by an adhesive. Instead, the light guide 50 arranged in the outer surface of the holding member 60 may be held by the inner surface of the accommodation portion 65 and the inner surface of the cover 17 without being adhered to the inner surface of the accommodation portion 65.

The location of the light guide 50 that functions as the indication portion is not particularly limited. For example, the light guide 50 that functions as the indication portion may be arranged in a region of the driver seat side surface 13A of the ring 13 that is located upward from the top 13T. Alternatively, the light guide 50 that functions as the indication portion may be arranged in the ring 13 located downward from the boss 14. As another option, the light guide 50 that functions as the indication portion may be arranged at the boss 14 and the spokes 15.

Sets of the combination of the light guide 50 and the light sources 42 may be used. In this case, the illumination mode of the light guide 50 may be changed in each combination. Thus, vehicle information can be presented with a larger number of illumination modes.

Holding Member 60
A reflecting member may be arranged on the inner surface of the accommodation portion 65 of the holding member 60. This reflects the light emitted from the light guide 50 toward the front or relatively toward the front (side opposite to driver seat) with the reflecting member. Thus, the amount of light emitted to the driver seat increases. The reflecting member may be arranged on the entire inner surface of the accommodation portion 65. Alternatively, the reflecting member may be arranged only on a surface of the light guide 50 that opposes the side opposite to the driver seat side surface.

The structure in which the holding member 60 is coupled to the base 30 is not particularly limited. For example, the lips 66, the engagement tabs 68, the engagement projections 69, and the like may be omitted from the holding member 60, and the holding member 60 may be adhered to the outer surface of the base 30 by an adhesive or the like. In this case, the engagement projections 33 may be omitted from the coupling portion 31 of the base 30.

The light emitting units 41, the light guide 50, and the holding member 60 may be unitized with the cover 17.

The holding member 60 may be omitted. In this case, for example, only the light emitting units 41 and the light guide 50 are unitized, and the light emitting units 41 and the light guide 50 that are unitized are coupled to the base 30. Alternatively, the light emitting units 41 and the light guide 50 may be separately coupled to the base 30.

Light Blocking Member 17B

The light blocking member 17B may be arranged on the outer surface of the lens 17A. Alternatively, the light blocking member 17B may be arranged at the base 30 and the holding member 60.

The light blocking member 17B may be omitted. In this case, there is no limit to the light emission region A1 of light from the light guide 50 out of the ring 13.

Light Emission Region A1

In the above embodiment, the light emission region A1 is set about the virtual line L2 that is parallel to the axis L1 of the steering shaft 11 extends through the center of the light guide 50 in the front-to-rear direction. Instead, for example, the light emission region A1 may be set about a virtual line that connects the eyes of the driver D (drivers D1, D2, and the like) sitting in the driver seat S1 to the center of the light guide 50 in the front-to-rear direction.

Ring 13

The assisting portions 16 may be omitted from the ring 13. In this case, the light emitting units 41 are arranged in regions other than the assisting portions 16.

The soft sheet 71 may be omitted from the ring 13.

The steering wheel 12 may be applied to a steering wheel that does not include the ring metal core 20.

Others

The vibration unit 18 may be omitted.

The steering wheel 12 does not have to be applied to a steering device of a vehicle and may be applied to a steering wheel of a steering device of a transportation means such as an airplane and a ship. In this case, a vehicle includes not only automobiles but also various types of industrial vehicles.

The present examples and embodiments are to be considered as illustrative and not restrictive, and the invention is not to be limited to the details given herein, but may be modified within the scope and equivalence of the appended claims.

The invention claimed is:

1. A steering wheel comprising an indicator, the indicator including:
    a light source that emits light; and
    a light guide including an outer surface and an end opposing the light source, wherein the light from the light source enters the end of the light guide, and some of the light is emitted from the outer surface, wherein
    the light guide includes a driver seat side surface,
    part of the driver seat side surface includes a recess, which is shaped so that light entering the end is emitted from the light guide,
    the recess is one of a plurality of recesses,
    part of the driver seat side surface of the light guide includes the recesses, which are spaced apart from one another by a predetermined interval,
    the recesses have surface areas that differ from one another and increase as the light source becomes more distant, and
    a light emission region is set based on a virtual line connecting eyes of the driver, when properly sitting in a driver's seat, and a center of the light guide.

2. The steering wheel according to claim 1, wherein the light source is configured to emit different colors of light.

3. The steering wheel according to claim 1, wherein
    the end of the light guide is one of two ends of the light guide;
    the light source includes a first light source opposing one of the two ends of the light guide and a second light source opposing another one of the two ends of the light guide, and
    the first light source and the second light source are configured to emit different colors of light.

4. The steering wheel according to claim 1, further comprising a control circuit that controls a light emission mode of the light emitted from the light source and changes the light emitted from the light guide in color and an illuminated region of the light guide.

5. The steering wheel according to claim 1, further comprising:
    a ring held for steering;
    a boss located at a central part of the ring;
    a spoke that couples the ring and the boss; and
    an assisting portion arranged on the ring and bulged toward the boss, wherein the assisting portion is located at a part of the ring upward from the boss, wherein
    the light source is arranged in the assisting portion, and
    the light guide is formed by a rod extending in a circumferential direction of the ring.

6. A steering wheel comprising a ring metal core and an indicator, the indicator including:
    a light source that emits light;
    a light guide that extends in a circumferential direction of the steering wheel, the light guide including an outer surface and an end opposing the light source in the circumferential direction, wherein the light from the light source enters the end of the light guide, and some of the light is emitted from the outer surface; and
    a holding member that holds the light source and the light guide, wherein
    an outer surface of the holding member includes an accommodation portion that is curved and recessed toward the ring metal core,
    the light guide is arranged in the accommodation portion and
    a light emission region is set based on a virtual line connecting eyes of the driver, when properly sitting in a driver's seat, and a center of the light guide.

7. The steering wheel according to claim 6, wherein the holding member is elongated in a circumferential direction of the steering wheel, the holding member has an inner surface facing toward the ring metal core of the steering wheel and an outer surface facing toward an opposite side of the inner surface, and the light guide is held by the outer surface of the holding member.

8. The steering wheel according to claim 6, wherein the light source, the light guide, and the holding member are unitized to form the indicator.

9. The steering wheel according to claim 6, wherein the circumferential direction of the steering wheel corresponds to a circumferential direction around an axis of a steering shaft.

10. The steering wheel according to claim 6, wherein the holding member includes two ends, longitudinally, and two through holes, the two through holes extend through the holding member at portions near the two ends, respectively, the light guide extending through the two through holes, and the light guide is arranged in the accommodation portion between the two through holes.

11. The steering wheel according to claim 10, wherein the light source is arranged on the inner surface of the holding member.

* * * * *